United States Patent
Altintas et al.

(10) Patent No.: US 10,897,336 B2
(45) Date of Patent: Jan. 19, 2021

(54) AUTOMOTIVE RADAR USING OFDM PILOT AND DATA CARRIERS FOR INTEGRATED RADAR AND COMMUNICATIONS

(71) Applicant: TOYOTA JIDOSHA KABUSHIKI KAISHA, Toyota (JP)

(72) Inventors: Onur Altintas, Mountain View, CA (US); Chang-Heng Wang, Mountain View, CA (US)

(*) Notice: Subject to any disclaimer, the term of this patent is extended or adjusted under 35 U.S.C. 154(b) by 58 days.

(21) Appl. No.: 16/202,886

(22) Filed: Nov. 28, 2018

(65) Prior Publication Data

US 2020/0169362 A1    May 28, 2020

(51) Int. Cl.
| | | |
|---|---|---|
| H04L 5/00 | (2006.01) | |
| H04W 4/40 | (2018.01) | |
| H04W 72/04 | (2009.01) | |
| G01S 13/93 | (2020.01) | |
| G01S 13/931 | (2020.01) | |

(52) U.S. Cl.
CPC .......... *H04L 5/0048* (2013.01); *G01S 13/931* (2013.01); *H04L 5/001* (2013.01); *H04L 5/0044* (2013.01); *H04W 4/40* (2018.02); *H04W 72/0453* (2013.01)

(58) Field of Classification Search
CPC ... H04W 28/04; H04W 72/04; H04W 72/042; H04W 88/08; H04L 5/0007
USPC ......................................................... 370/329
See application file for complete search history.

(56) References Cited

U.S. PATENT DOCUMENTS

| | | | | |
|---|---|---|---|---|
| 9,945,933 | B2* | 4/2018 | Ding | G01S 7/023 |
| 10,477,371 | B2* | 11/2019 | Gulati | H04W 76/14 |
| 10,491,261 | B1* | 11/2019 | Al-Eidan | H04B 1/707 |
| 2008/0095100 | A1* | 4/2008 | Cleveland | H04L 5/0007 |
| | | | | 370/328 |
| 2014/0321479 | A1* | 10/2014 | Zhang | H04J 13/102 |
| | | | | 370/474 |
| 2014/0334420 | A1* | 11/2014 | You | H04L 25/0204 |
| | | | | 370/329 |
| 2014/0348097 | A1* | 11/2014 | Park | H04L 25/0226 |
| | | | | 370/329 |
| 2017/0019922 | A1* | 1/2017 | Zhao | H04W 74/0866 |
| 2017/0188391 | A1* | 6/2017 | Rajagopal | H04W 74/0816 |
| 2017/0280445 | A1* | 9/2017 | Jiang | H04L 47/27 |
| 2017/0310758 | A1* | 10/2017 | Davis | H04B 1/69 |

(Continued)

*Primary Examiner* — Peter G Solinsky
*Assistant Examiner* — Sanjay K Dewan
(74) *Attorney, Agent, or Firm* — Burbage Law, P.C.; Jon-Michael Burbage; Elizabeth Ruzich

(57) ABSTRACT

The disclosure includes embodiments for performing integrated vehicular radar processing and data communications. In some embodiments, a method includes constructing a wireless signal based on a set of pilot subcarriers and a set of data subcarriers. The set of pilot subcarriers is used for radar processing and channel estimation while the set of data subcarriers is used for transmitting data. The method includes transmitting the wireless signal. The method includes listening for radar feedback associated with the wireless signal. The method includes determining pilot-subcarrier radar data from the radar feedback. The pilot-subcarrier radar data describes a part of the radar feedback that is associated with the set of pilot subcarriers. The method includes generating a radar processing result based on the pilot-subcarrier radar data to reduce a peak to side-lobe ratio of the radar processing result.

20 Claims, 15 Drawing Sheets

(56) References Cited

U.S. PATENT DOCUMENTS

| | | | | |
|---|---|---|---|---|
| 2017/0367058 A1* | 12/2017 | Pelletier | ............ | H04W 56/0045 |
| 2018/0159935 A1* | 6/2018 | Cavalcanti | .............. | H04W 4/44 |
| 2018/0199174 A1* | 7/2018 | Gozalvez-Serrano | ....................... H04W 72/121 | |
| 2018/0324565 A1* | 11/2018 | Belagal Math | ....... | H04W 4/046 |
| 2019/0037448 A1* | 1/2019 | Shan | ..................... | H04W 28/22 |
| 2019/0116475 A1* | 4/2019 | Lee | ......................... | H04W 4/40 |
| 2019/0273592 A1* | 9/2019 | Baghel | .................. | H04L 5/0039 |
| 2019/0297622 A1* | 9/2019 | Noh | .................. | H04W 72/0446 |

* cited by examiner

AUTOMOTIVE RADAR USING OFDM PILOT AND DATA CARRIERS FOR INTEGRATED RADAR AND COMMUNICATIONS

BACKGROUND

The specification relates to applying Orthogonal Frequency-Division Multiplexing (OFDM) signals for integrated radar and communication applications in vehicles.

Vehicles are expected to exchange an increasing amount of data with one another for various vehicular applications via Vehicle-to-Everything (V2X) communications. For example, vehicles may generate a large volume of sensor data and share the sensor data with one another via any form of V2X communications so that driving safety of the vehicles can be improved with the processing of the sensor data. However, the bandwidth allocated for V2X communications is limited.

Automotive radar uses the spectrum (e.g., between 76 gigahertz (GHz) and 81 GHz) that is dedicated and allocated for radar measurement. Dual use of this spectrum for both data communications and radar functionality has been discussed for some years. An example of the dual use of this spectrum includes employing an integrated radar and communication technique in vehicular applications. In the integrated radar and communication technique, vehicles use the same waveform for both radar and communication purposes.

For example, as shown in FIG. 1A, an integrated radar communication device 170 transmits a waveform which carries information to another integrated radar communication device 171. The other integrated radar communication device 171 decodes the information from the received waveform. Meanwhile, the waveform is reflected by the other integrated radar communication device 171 and any other objects 172, such that the integrated radar communication device 170 receives radar feedback associated with the waveform and then performs radar processing on the radar feedback. In this way, no other spectrum than the already allocated radar band is required for both radar processing and data communications. Also, this integrated radar and communication technique is more secure than omni-directional methods of wireless communications. For example, in some embodiments this integrated radar and communications technique is more secure because it only transmits in a limited number of directions (it is "highly directional"), and this renders the wireless messages transmitted by this technique to be less likely to be intercepted or overheard relative to omnidirectional transmissions which have more opportunity to be intercepted or overheard because they are transmitted all directions.

SUMMARY

Described are embodiments of an OFDM signal module that is capable of using OFDM signals for both radar applications and wireless communication applications in vehicles. The OFDM signal module uses pilot subcarriers of OFDM signals for radar detection purpose, which allows using specially-defined sequences (e.g., pilot symbols) to achieve a lower peak to side-lobe ratio to improve the radar imaging result. By comparison, if regular OFDM symbols (e.g., data symbols) are used for radar functionality, due to randomness of the transmitted data symbols, the resulting radar imaging result often suffers from a high peak to side-lobe ratio. The high peak to side-lobe ratio may lead to issues such as ghost objects in radar imaging (i.e., detection of non-existing objects), which may severely degrade the radar imaging result. In some embodiments, the OFDM signals are transmitted and received in the spectrum of bandwidth allocated for automobile applications (between 76 GHz and 81 GHz).

In some embodiments, the OFDM signal module is installed in an onboard unit of a connected vehicle (i.e., an OFDM system of the vehicle). The OFDM system includes: (1) a communication subsystem having a communication receiver and a communication transmitter for receiving and transmitting OFDM signals; (2) a radar system; and (3) the OFDM signal module that is operable to encode and decode the OFDM signals.

In some embodiments, the OFDM system uses pilot subcarriers in OFDM signals for radar processing and channel estimation while transmitting data in other subcarriers. The communication receiver of the OFDM system is configured so that, with the same waveform of a received signal, the communication receiver can demodulate data included in the received signal while also estimating a varying vehicular channel using pilot symbols that are encoded in pilot subcarriers of the received signal.

The approach implemented by the OFDM system described herein beneficially reduces the peak to side-lobe ratio for radar processing when compared to radar processing on randomly generated data symbols in the data subcarriers. As a result, using the OFDM system described herein beneficially results in OFDM signals being usable for both radar applications and wireless communication applications in automobiles. For example, an example advantage and improvement provided by the OFDM system described herein include using pilot subcarriers in OFDM signals for radar processing and channel estimation while transmitting data in other subcarriers. There is no existing solution that uses pilot subcarriers in OFDM signals for radar processing and channel estimation while transmitting data in other subcarriers.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for a vehicle, including: constructing a wireless signal based on a set of pilot subcarriers and a set of data subcarriers, where the set of pilot subcarriers is used for radar processing and channel estimation while the set of data subcarriers is used for transmitting data; transmitting the wireless signal; listening for radar feedback associated with the wireless signal; determining pilot-subcarrier radar data from the radar feedback, where the pilot-subcarrier radar data describes a part of the radar feedback that is associated with the set of pilot subcarriers; and generating a radar processing result based on the pilot-subcarrier radar data to reduce a peak to side-lobe ratio of the radar processing result. Other embodiments of this aspect include corresponding computer systems, apparatus, and computer programs recorded on one or more computer storage devices, each configured to perform the actions of the methods.

Implementations may include one or more of the following features. The method where the set of pilot subcarriers is encoded with a set of pilot symbols respectively and the set of data subcarriers is encoded with a set of data symbols respectively. The method where constructing the wireless signal includes: retrieving history data describing one or more historical radar processing results; determining, based on the history data, one or more parameters for configuring one or more of the set of pilot subcarriers, the set of data subcarriers and a set of guard subcarriers in the wireless signal; informing an intended receiver of the one or more parameters through a control channel shared between a transmitter and the intended receiver; and configuring the one or more of the set of pilot subcarriers, the set of data subcarriers and the set of guard subcarriers in the wireless signal based on the one or more parameters (e.g., in some embodiments, the parameters described by the parameter data 133 depicted in FIG. 1D). The method where the one or more parameters includes a pilot-subcarrier parameter and determining the one or more parameters includes: determining a number of pilot subcarriers to be included in the set of pilot subcarriers based on the history data; determining a frequency location for each pilot subcarrier in the set of pilot subcarriers based on the history data; and determining the pilot-subcarrier parameter based on the number of pilot subcarriers and the frequency location for each pilot subcarrier. The method where the set of pilot subcarriers is configured in the wireless signal based on the pilot-subcarrier parameter. The method where the one or more parameters includes a data-subcarrier parameter and determining the one or more parameters includes: determining a number of data subcarriers to be included in the set of data subcarriers based on the history data; determining a frequency location for each data subcarrier in the set of data subcarriers based on the history data; and determining the data-subcarrier parameter based on the number of data subcarriers and the frequency location for each data subcarrier. The method where the set of data subcarriers in the wireless signal is configured based on the data-subcarrier parameter. The method where the one or more parameters includes a guard-subcarrier parameter and determining the one or more parameters includes: determining a number of guard subcarriers to be included in the set of guard subcarriers based on the history data; determining a frequency location for each guard subcarrier in the set of guard subcarriers based on the history data; and determining the guard-subcarrier parameter based on the number of guard subcarriers and the frequency location for each guard subcarrier. The method where the set of guard subcarriers in the wireless signal is configured based on the guard-subcarrier parameter. The method further including: updating the history data based on the radar processing result. The method where a placement of the set of pilot subcarriers in the wireless signal is fixed. The method where a placement of the set of pilot subcarriers in the wireless signal is adaptive. The method further including: assessing radar performance based on the radar processing result; and modifying one or more of the placement of the set of pilot subcarriers and a placement of the set of data subcarriers in the wireless signal based on the radar performance. The method where modifying the placement of the set of pilot subcarriers in the wireless signal includes one or more of changing one or more locations of one or more pilot subcarriers in the set of pilot subcarriers and changing a number of pilot subcarriers included in the set of pilot subcarriers. The method where modifying the placement of the set of data subcarriers in the wireless signal includes one or more of changing one or more locations of one or more data subcarriers in the set of data subcarriers and changing a number of data subcarriers included in the set of data subcarriers. The method where the set of pilot subcarriers and the set of data subcarriers are assigned to members in a vehicular micro cloud so that each member is assigned with at least a pilot subcarrier and one or more data subcarriers next to the pilot subcarrier to avoid radar interference among the members in the vehicular micro cloud. The method where the wireless signal includes an Orthogonal Frequency-Division Multiplexing (OFDM) signal. Implementations of the described techniques may include hardware, a method or process, or computer software on a computer-accessible medium.

One general aspect includes a system for a vehicle, including a processor and a non-transitory memory storing computer code which, when executed by the processor, causes the processor to: construct a wireless signal based on a set of pilot subcarriers and a set of data subcarriers, where the set of pilot subcarriers is used for radar processing and channel estimation while the set of data subcarriers is used for transmitting data; transmit the wireless signal; listen for radar feedback associated with the wireless signal; determine pilot-subcarrier radar data from the radar feedback, where the pilot-subcarrier radar data describes a part of the radar feedback that is associated with the set of pilot subcarriers; and generate a radar processing result based on the pilot-subcarrier radar data to reduce a peak to side-lobe ratio of the radar processing result. Other embodiments of this aspect include corresponding computer systems, apparatus, and computer programs recorded on one or more computer storage devices, each configured to perform the actions of the methods.

Implementations may include one or more of the following features. The system where the set of pilot subcarriers is encoded with a set of pilot symbols respectively and the set of data subcarriers is encoded with a set of data symbols respectively. The system where the computer code, when executed by the processor, causes the processor to construct the wireless signal at least by: retrieving history data describing one or more historical radar processing results; determining, based on the history data, one or more parameters for configuring one or more of the set of pilot subcarriers, the set of data subcarriers and a set of guard subcarriers in the wireless signal; informing an intended receiver of the one or more parameters through a control channel shared between a transmitter and the intended receiver; and configuring the one or more of the set of pilot subcarriers, the set of data subcarriers and the set of guard subcarriers in the wireless signal based on the one or more parameters. The system where the computer code, when executed by the processor, causes the processor further to: assess radar performance based on the radar processing result; and modify one or more of a placement of the set of pilot subcarriers and a placement of the set of data subcarriers in the wireless signal based on the radar performance. Implementations of the described techniques may include hardware, a method or process, or computer software on a computer-accessible medium.

One general aspect includes a computer program product including a non-transitory memory storing computer-executable code that, when executed by a processor, causes the processor to: construct a wireless signal based on a set of pilot subcarriers and a set of data subcarriers, where the set of pilot subcarriers is used for radar processing and channel estimation while the set of data subcarriers is used for transmitting data; transmit the wireless signal; listen for radar feedback associated with the wireless signal; determine pilot-subcarrier radar data from the radar feedback, where the pilot-subcarrier radar data describes a part of the radar feedback that is associated with the set of pilot subcarriers; and generate a radar processing result based on the pilot-subcarrier radar data to reduce a peak to side-lobe ratio of the radar processing result. Other embodiments of this aspect include corresponding computer systems, apparatus, and computer programs recorded on one or more computer storage devices, each configured to perform the actions of the methods.

Implementations may include one or more of the following features. The computer program product where the computer-executable code, when executed by the processor, causes the processor to construct the wireless signal at least by: retrieving history data describing one or more historical radar processing results; determining, based on the history data, one or more parameters for configuring one or more of the set of pilot subcarriers, the set of data subcarriers and a set of guard subcarriers in the wireless signal; informing an intended receiver of the one or more parameters through a control channel shared between a transmitter and the intended receiver; and configuring the one or more of the set of pilot subcarriers, the set of data subcarriers and the set of guard subcarriers in the wireless signal based on the one or more parameters. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
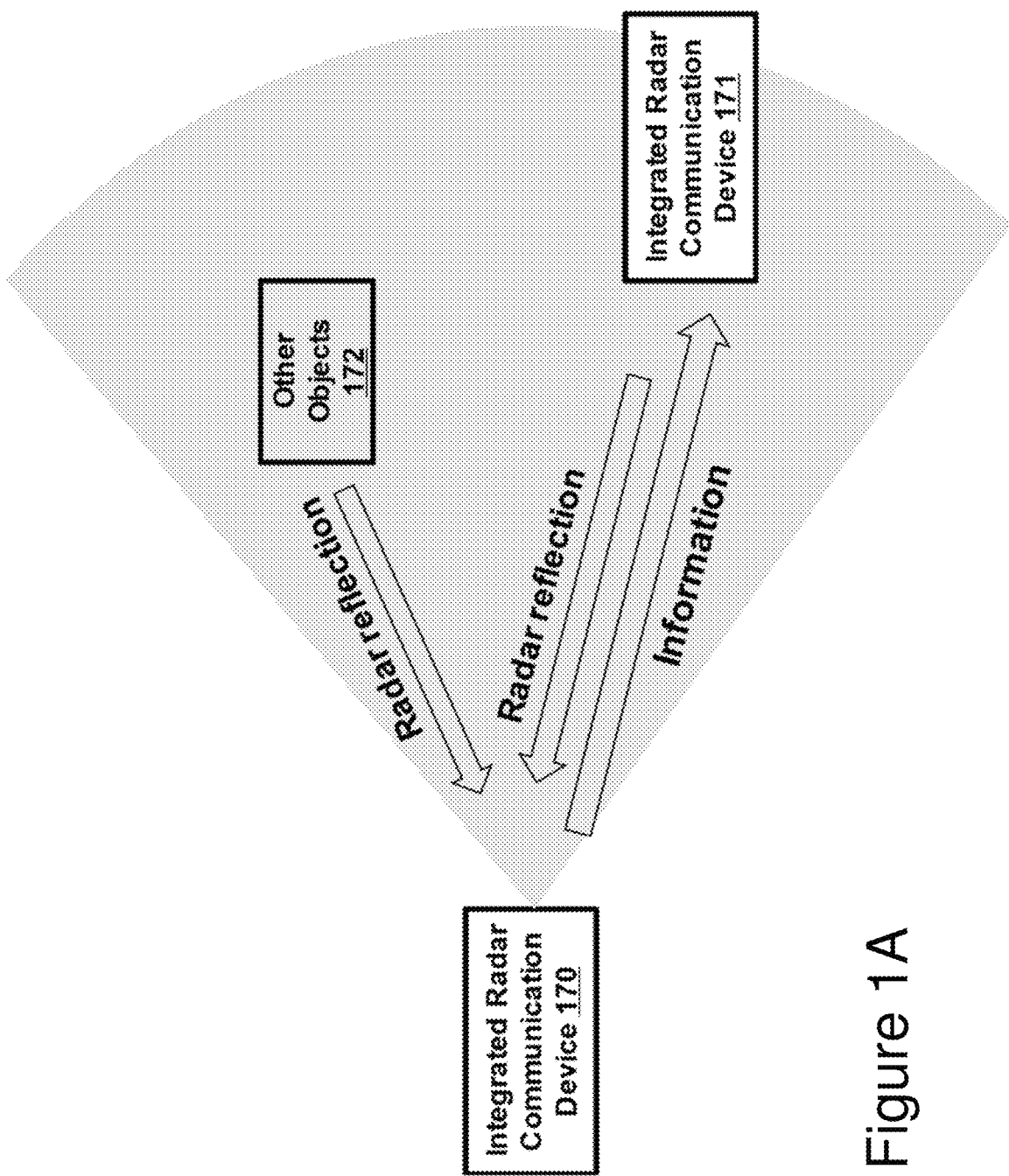
FIG. 1A is a block diagram illustrating an example application of an integrated radar and communication technique.
Figure 1B:
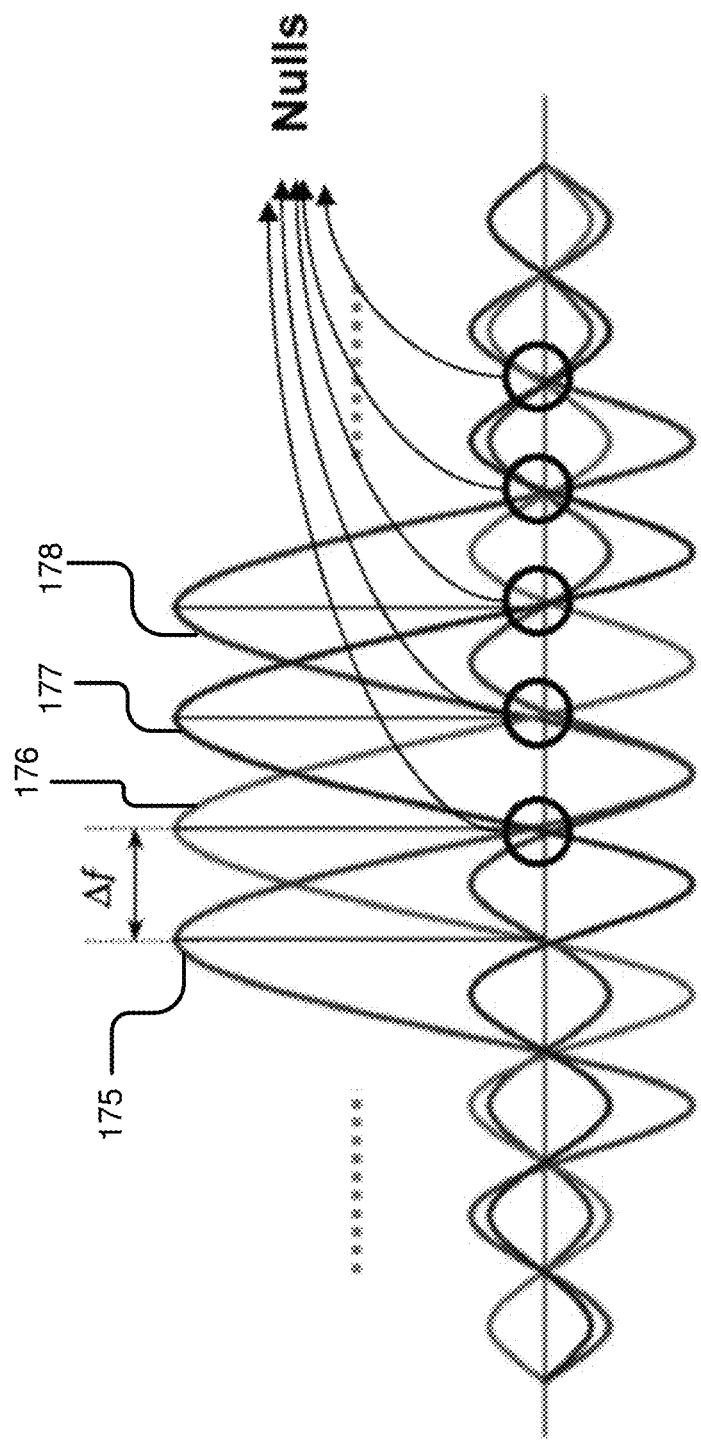
FIG. 1B is a graphical representation illustrating example subcarriers of an OFDM signal.

An example multi-carrier modulation scheme is OFDM, which separates an available bandwidth into multiple narrow bands, with each narrow band carrying one modulated symbol to be transmitted (e.g., each narrow band is represented by a subcarrier, and the subcarrier is modulated using a modulation scheme such as quadrature phase-shift keying (QPSK) or any other suitable type of modulation schemes). FIG. 1B illustrates a signal spectrum of an OFDM signal (also referred to as an OFDM waveform interchangeably). The OFDM waveform includes, for example, subcarriers 175, 176, 177 and 178 and any other subcarriers not shown in FIG. 1B. On the signal spectrum, the distance between each two adjacent subcarriers (illustrated as $\Delta f$ in a frequency domain) is designed in such a way that each subcarrier has nulls at locations of other subcarriers, so that each subcarrier does not interfere with other subcarriers. Thus, these subcarriers are referred to as "orthogonal." This orthogonal arrangement allows the subcarriers to be tightly packed instead of separating the subcarriers with a certain margin (when compared to frequency division multiplexing).

The modulation and demodulation of an OFDM waveform may be efficiently implemented through fast Fourier transform (FFT) and inverse fast Fourier transform (IFFT), where the FFT transforms a signal (in the time domain) to a spectrum (in the frequency domain), while the IFFT transforms a spectrum back to a corresponding time-domain signal.

Figure 1C:
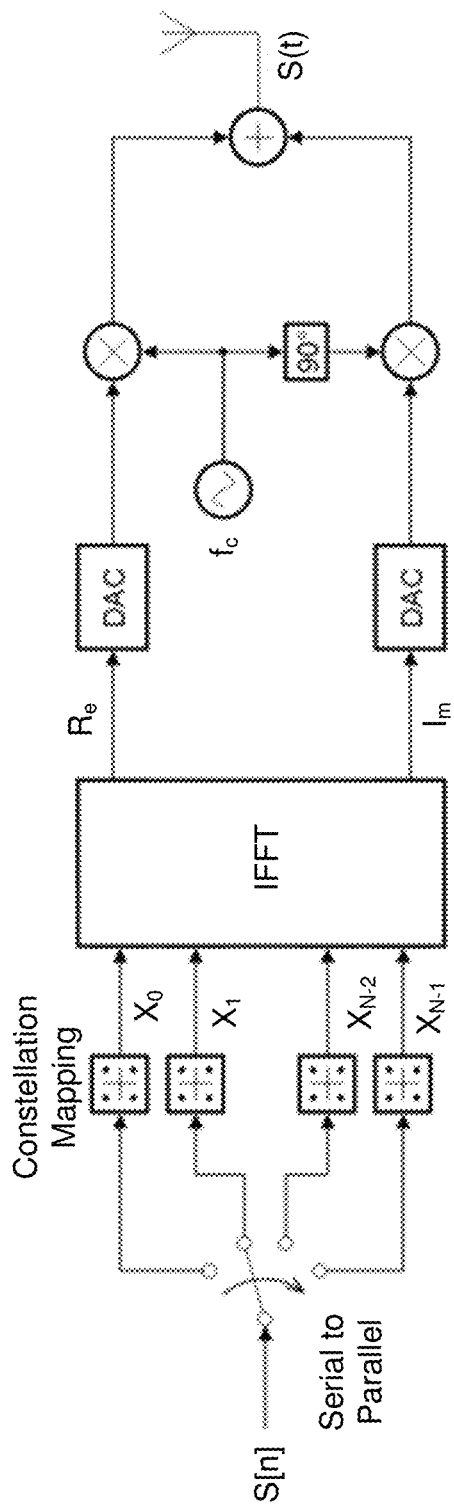
FIG. 1C is a block diagram illustrating generation of an OFDM signal.

Generation of an OFDM waveform is illustrated in FIG. 1C using an OFDM system. The OFDM system performs one or more of the following operations to generate an OFDM waveform: (1) modulating data bits into symbols with a modulation scheme such as QPSK or quadrature amplitude modulation (QAM) (see "constellation mapping" in FIG. 1C); (2) encoding the modulated symbols on the subcarriers (in the frequency domain); (3) performing IFFT to obtain time domain samples of the OFDM waveform; (4) using digital-to-analog converters (DAC) to convert the time domain samples into analog signals; and (5) mixing the analog signals with a carrier signal $f_c$ to transform the mixed signal to radio frequency (RF).

When applying an OFDM waveform in a radar application, a transmitter of the OFDM waveform also uses its receiving antenna(s) to receive reflections of the OFDM waveform from objects. A round-trip delay of a received reflection from an object includes distance information (referred to as "range" in radar literature) of the object, while the Doppler effect changes a frequency of the waveform and is used to determine a velocity of the object. For example, in radar processing, a delayed signal introduces a phase shift on each subcarrier. Such phase shift can be determined by comparing the received waveform with the original transmitted waveform. The velocity of the object can be determined by integrating the range processing result over several OFDM symbols.

However, even if regular OFDM symbols can be used for radar functionality, due to randomness of the transmitted data symbols, a resulting radar imaging often suffers from a high peak to side-lobe ratio. The high peak to side-lobe ratio may lead to issues such as ghost objects in radar imaging (i.e., detection of non-existing objects), which may severely degrade the radar imaging result.

An OFDM system (including an OFDM signal module) described herein uses pilot subcarriers of OFDM signals for radar detection purpose, which allows the usage of specially-defined sequences (e.g., pilot symbols) to achieve a lower peak to side-lobe ratio to improve the radar imaging result. The approach implemented by the OFDM system described herein beneficially reduces the peak to side-lobe ratio for radar processing when compared to radar processing on randomly generated data symbols in the data subcarriers. As a result, using the OFDM system described herein beneficially results in OFDM signals being usable for both radar applications and wireless communication applications in automobiles.

In some embodiments, the OFDM signal module is installed in an onboard unit of a connected vehicle (i.e., the OFDM system of the vehicle). The OFDM system includes: (1) a communication subsystem having a communication receiver and a communication transmitter for receiving and transmitting OFDM signals; (2) a radar system for performing radar processing (e.g., receiving and processing radar feedback); and (3) the OFDM signal module that is operable to encode and decode OFDM signals as described below in more detail.

In some embodiments, the OFDM system uses pilot subcarriers in OFDM signals for radar processing and channel estimation while transmitting data in other subcarriers. The communication receiver of the OFDM system is configured so that, with a same waveform, the communication receiver can demodulate data included in received signals while also estimating a varying vehicular channel with pilot symbols that are encoded in the pilot subcarriers of the received signals.

Example Overview

Figure 1D:
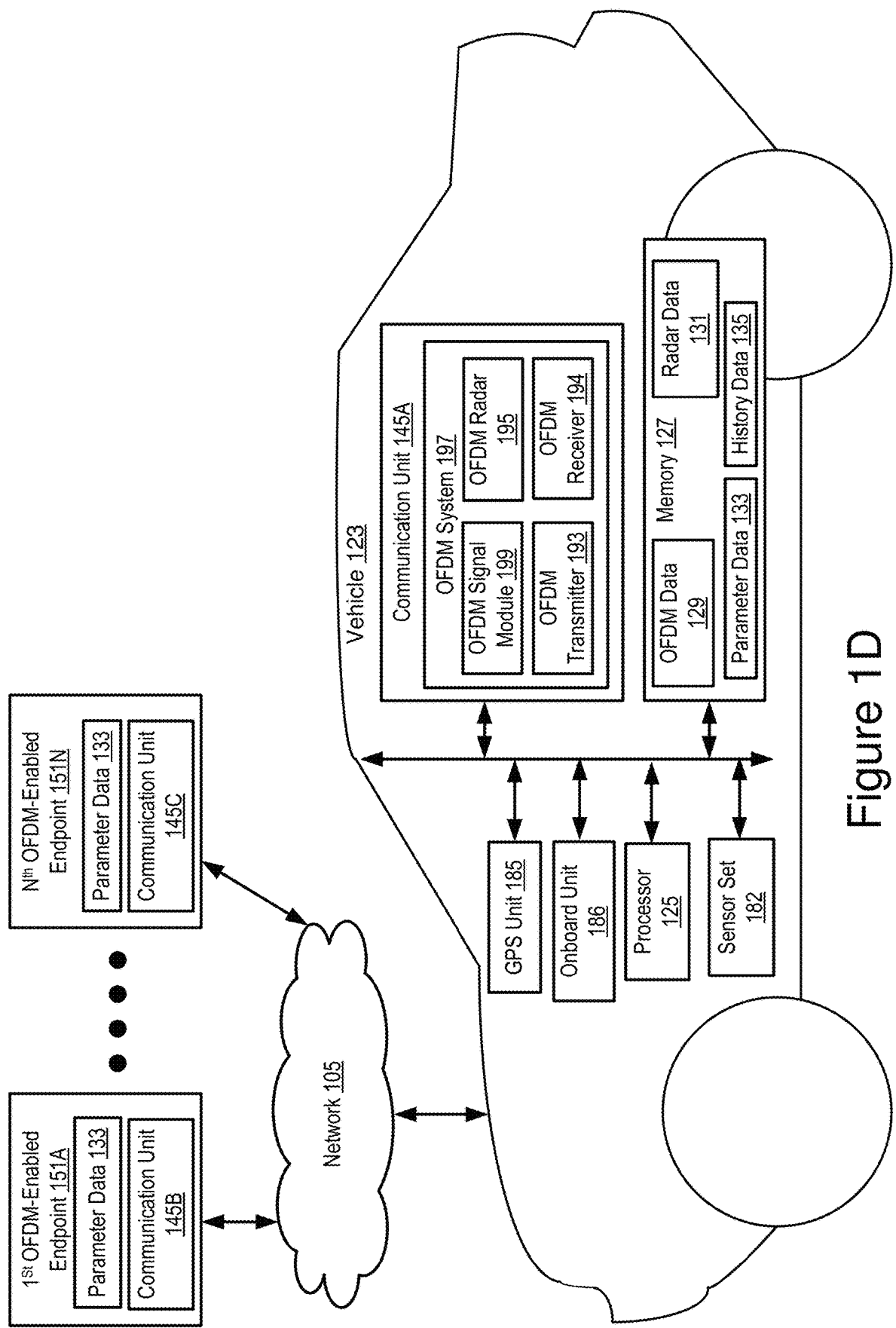
FIG. 1D is a block diagram illustrating an operating environment for an OFDM signal module according to some embodiments.

Referring to FIG. 1D, depicted is an operating environment 100 for an OFDM signal module 199. The operating environment 100 may include one or more of the following elements: a vehicle 123; and one or more OFDM-enabled endpoints 151 (e.g., a first OFDM-enabled endpoint 151A . . . and an Nth OFDM-enabled endpoint 151N which are referred to as "OFDM-enabled endpoint 151" individually or collectively). These elements of the operating environment 100 may be communicatively coupled to a network 105.

Although one vehicle 123, two OFDM-enabled endpoints 151 and one network 105 are depicted in FIG. 1D, in practice the operating environment 100 may include one or more vehicles 123, one or more OFDM-enabled endpoints 151 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, Long-Term Evolution (LTE), LTE-Vehicle-to-Vehicle (LTE-V2V), LTE-Vehicle-to-Infrastructure (LTE-V2I), LTE-Vehicle-to-Everything (LTE-V2X), LTE-Device-to-Device (LTE-D2D), VoLTE, 5G-V2X or any other mobile data network or combination of mobile data networks. Further, the network 105 may include one or more IEEE 802.11 wireless networks.

In some embodiments, one or more of the vehicle 123 and the OFDM-enabled endpoint 151 may be DSRC-equipped devices. The network 105 may include one or more communication channels shared among the vehicle 123 and the OFDM-enabled endpoint 151. The communication channel may include Dedicated Short-Range Communication (DSRC), LTE-V2X, full-duplex wireless communication or any other wireless communication protocol. For example, the network 105 may be used to transmit a DSRC message, DSRC probe or Basic Safety Message (BSM) including any of the data described herein. However, it should be understood that DSRC is not a requirement here. Any type of V2X radios may be used.

The vehicle 123 may be any type of vehicle. For example, the vehicle 123 may include one of the following types of vehicles: a car; a truck; a sports utility vehicle; a bus; a semi-truck; a drone or any other roadway-based conveyance. In some embodiments, the vehicle 123 can be a connected vehicle that includes a communication unit described below.

In some embodiments, the vehicle 123 may include an autonomous vehicle or a semi-autonomous vehicle. For example, the vehicle 123 may include an Advanced Driver-Assistance System (ADAS system). The ADAS system may provide some or all of the functionality that provides autonomous functionality.

The vehicle 123 may include one or more of the following elements: a processor 125; a memory 127; a communication unit 145A; a GPS unit 185; a sensor set 182; and an onboard unit 186. These elements of the vehicle 123 may be communicatively coupled to one another via a bus.

In some embodiments, the processor 125 and the memory 127 may be elements of an onboard vehicle computer system. The onboard vehicle computer system may be operable to cause or control the operation of the OFDM signal module 199. The onboard vehicle computer system may be operable to access and execute the data stored on the memory 127 to provide the functionality described herein for the OFDM signal module 199.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The vehicle 123 may include one or more memories 127.

The memory 127 of the vehicle 123 may store one or more of: OFDM data 129; radar data 131; parameter data 133; and history data 135.

The OFDM data 129 includes digital data that describes data payload and pilot symbols for an OFDM signal as well as digital data that is generated based on processing or analyzing the data payload and the pilot symbols. For example, the OFDM data 129 includes digital data describing an OFDM signal, including: (1) one or more pilot symbols; (2) a data payload; and (3) radar information that is determinable based on radar feedback of the OFDM signal.

The radar data 131 includes digital data describing radar feedback associated with a transmitted OFDM signal. In some embodiments, the transmitted OFDM signal is constructed using a set of pilot subcarriers and a set of data subcarriers. The radar data 131 includes pilot-subcarrier radar data describing a first part of the radar feedback associated with the set of pilot subcarriers in the transmitted OFDM signal. Alternatively or additionally, the radar data 131 includes data-subcarrier radar data describing a second part of the radar feedback associated with the set of data subcarriers in the transmitted OFDM signal.

The parameter data 133 includes digital data that describes one or more parameters that are used for constructing OFDM signals. For example, the parameter data 133 includes one or more of the following: (1) data describing a frequency band of an OFDM signal; (2) a guard-subcarrier parameter describing a placement of guard subcarriers relative to other subcarriers included in a waveform of the OFDM signal (e.g., a number of the guard subcarriers included in the waveform, a frequency location of each guard subcarrier included in the waveform); (3) a pilot-subcarrier parameter describing a placement of pilot subcarriers relative to the other subcarriers included in the waveform of the OFDM signal (e.g., a number of the pilot subcarriers included in the waveform, a frequency location of each pilot subcarrier included in the waveform); (4) a data-subcarrier parameter describing a placement of data subcarriers relative to the other subcarriers included in the waveform of the OFDM signal (e.g., a number of the data subcarriers included in the waveform, a frequency location of each data subcarrier included in the waveform). In some embodiments, only item (3) is needed to implement in an OFDM system 197 herein (which is described below in more detail).

The history data 135 includes digital data that describes one or more historical radar processing results for one or more OFDM signals that are transmitted by the OFDM system 197. In some embodiments, the parameter data 133 is configured based on the history data 135. In some embodiments, the history data 135 describes radar performance and radar requirements that are indicated based on historical radar processing results. Other example history data is possible.

The communication unit 145A transmits and receives data to and from the network 105 or to another communication channel. In some embodiments, the communication unit 145A may include a DSRC transceiver, a DSRC receiver and other hardware or software necessary to make the vehicle 123 a DSRC-enabled device. For example, the communication unit 145A includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System."

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

In some embodiments, the communication unit 145A includes any type of V2X communication antenna necessary to support one or more of the following V2X communication protocols: DSRC; mmWave; LTE-V2X; LTE-D2D; 5G-V2X; ITS-G5; ITS-Connect; LPWAN; visible light communication; television white space; Bluetooth; Wi-Fi, etc. The communication unit 145A includes a V2X radio.

The V2X radio is an electronic device that includes a V2X transmitter and a V2X receiver and is operable to send and receive wireless messages via any V2X protocol. For example, the V2X radio is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio includes multiple channels with at least one of these channels designated for sending and receiving BSMs and at least one of these channels designated for sending and receiving Personal Safety Messages (PSMs).

In some embodiments, the communication unit 145A includes the OFDM system 197. The OFDM system 197 includes hardware and software used for implementing OFDM data communications and radar processing. For example, the OFDM system 197 includes the OFDM signal module 199, an OFDM radar 195, an OFDM transmitter 193 and an OFDM receiver 194.

The OFDM transmitter 193 is a transmitter used for transmitting OFDM signals. The OFDM receiver 194 is a receiver used for receiving OFDM signals. In some embodiments, the OFDM transmitter 193 and the OFDM receiver 194 may be combined into an OFDM transceiver.

The OFDM radar 195 includes a radar system that is used for detecting and processing radar feedback associated with OFDM signals. For example, the OFDM radar 195 listens for radar feedback associated with an OFDM signal after the OFDM transmitter 193 transmits the OFDM signal. The OFDM radar 195 detects the radar feedback based on the listening and stores the radar feedback for further processing.

In some embodiments, the OFDM signal module 199 includes software that is operable, when executed by the processor 125, to cause the processor 125 to execute one or more steps of methods 300-600 described below with reference to FIGS. 3-6B. In some embodiments, the OFDM signal module 199 may be implemented using hardware including a field-programmable gate array ("FPGA") or an application-specific integrated circuit ("ASIC"). In some other embodiments, the OFDM signal module 199 may be implemented using a combination of hardware and software. The OFDM signal module 199 may be stored in a combination of the devices (e.g., servers or other devices), or in one of the devices.

The OFDM signal module 199 is described below in more detail with reference to FIGS. 2-10B.

In some embodiments, the GPS unit 185 includes any hardware and software necessary to make the vehicle 123 or the GPS unit 185 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the GPS unit 185 is a DSRC-compliant GPS unit that includes any hardware and software necessary to make the vehicle 123 or the DSRC-compliant GPS unit compliant with one or more of the following DSRC standards, including any derivative or fork thereof: IEEE 802.11; IEEE 1609.x (x=2, 3, 4); SAE J2735; SAE J2945.x (x=0, 1, and others), etc.

In some embodiments, the DSRC-compliant GPS unit is operable to provide GPS data describing the location of the vehicle 123 with lane-level accuracy.

In some embodiments, the DSRC-compliant GPS unit includes hardware that wirelessly communicates with a GPS satellite to retrieve GPS data that describes the geographic location of the vehicle 123 with a precision that is compliant with the DSRC standard. The DSRC standard requires that GPS data be precise enough to infer if two vehicles (one of which is, for example, the vehicle 123) are located in adjacent lanes of travel. In some embodiments, the DSRC-compliant GPS unit is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the OFDM signal module 199 described herein may analyze the GPS data provided by the DSRC-compliant GPS unit and determine what lane the vehicle 123 is traveling in based on the relative positions of two or more different vehicles (one of which is, for example, the vehicle 123) traveling on the roadway at the same time.

In some embodiments, the GPS unit 185 is a conventional GPS unit. For example, the GPS unit 185 may include hardware that wirelessly communicates with a GPS satellite to retrieve data that describes a geographic location of the vehicle 123. For example, the GPS unit 185 retrieves the GPS data from one or more GPS satellites.

By comparison to a DSRC-compliant GPS unit, a conventional GPS unit which is not compliant with the DSRC standard is unable to determine the location of a vehicle with lane-level accuracy. For example, a typical roadway lane is approximately 3 meters wide. However, a conventional GPS unit only has an accuracy of plus or minus 10 meters relative to the actual location of the vehicle. As a result, such conventional GPS units are not sufficiently accurate to identify a lane of travel for a vehicle based on GPS data alone; instead, systems having only conventional GPS units must utilize sensors such as cameras to identify the lane of travel of the vehicle. Identifying a lane of travel of a vehicle is beneficial, for example, because in some embodiments it may enable the OFDM signal module 199 to more accurately identify a location of the vehicle 123 traveling in a roadway having multiple lanes of travel.

The sensor set 182 includes one or more sensors that are operable to measure a roadway environment outside of the vehicle 123. For example, the sensor set 182 may include one or more sensors that record one or more physical characteristics of the road environment that is proximate to the vehicle 123. The memory 127 may store sensor data that describes the one or more physical characteristics recorded by the sensor set 182.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The onboard unit 186 may be any computing unit onboard on the vehicle 123. For example, the onboard unit 186 may include an electronic control unit (ECU). The ECU is an embedded system in automotive electronics that controls one or more of electrical systems or subsystems in the vehicle 123. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the vehicle 123 may include multiple onboard units 186. In some embodiments, the OFDM signal module 199 may be an element of the onboard unit 186.

Figure 7:
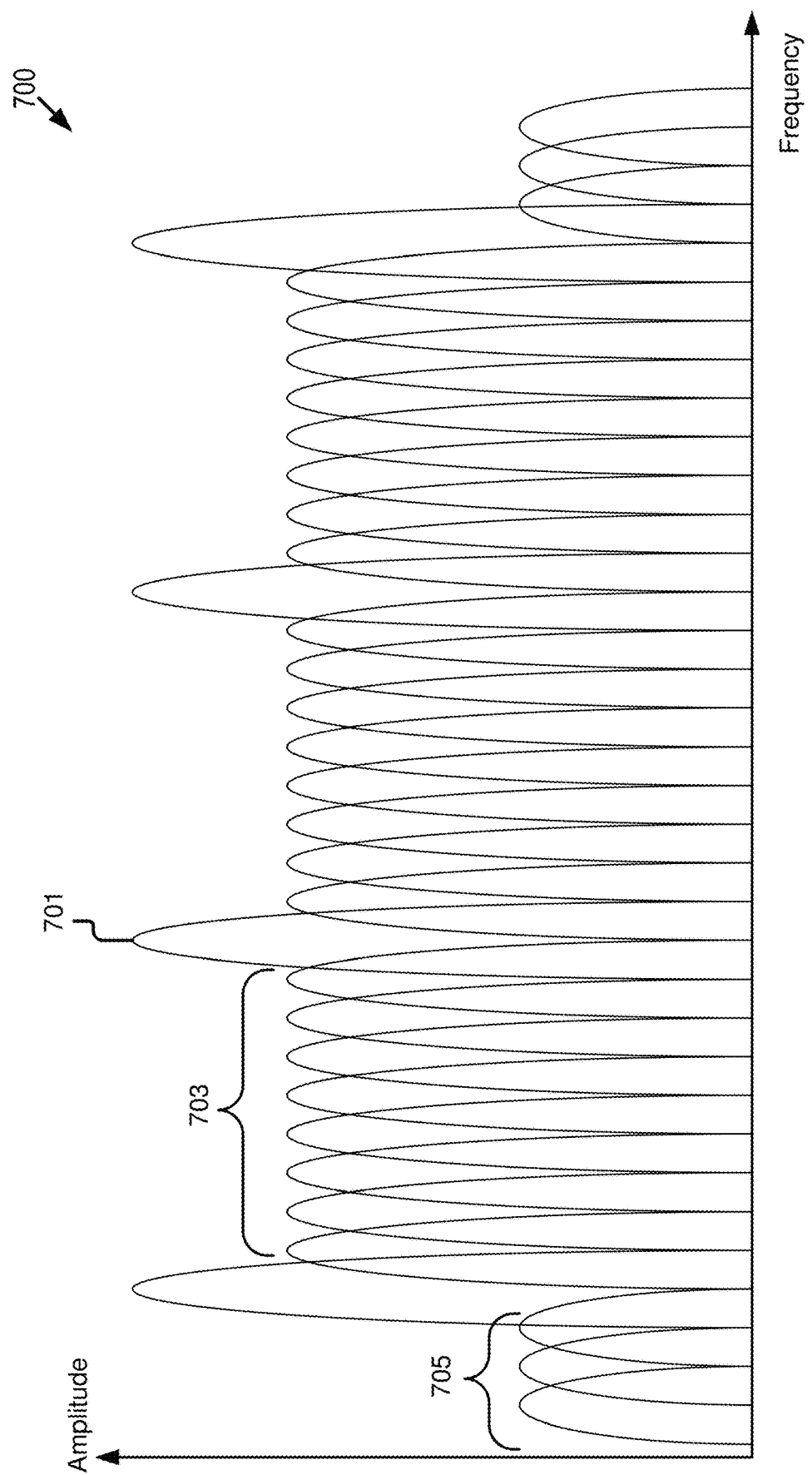
FIG. 7 is a graphical representation illustrating subcarriers of an example wireless signal according to some embodiments.

The OFDM-enabled endpoint 151 is a processor-based computing device that includes a communication unit that is similar to the one installed in the vehicle 123. In some embodiments, the OFDM-enabled endpoint 151 includes an instance of the OFDM system 197. The OFDM-enabled endpoint 151 is operable to transmit and receive OFDM signals that are encoded using an approach as illustrated in FIG. 7. In some embodiments, the operating environment 100 includes N number of OFDM-enabled endpoints 151, where N is a positive integer that is greater than one. In some embodiments, the OFDM-enabled endpoint 151 is a connected vehicle, a roadside unit (RSU), an edge server, a cloud server, or any other processor-based computing device that is operable to send and receive OFDM signals. In some embodiments, any combination of connected vehicles, RSUs, edge servers, and cloud servers, etc., may include instances of the OFDM system 197 so that the functionality of the OFDM system 197 is implemented in a distributed fashion among two or more endpoints connected to the network 105.

By way of examples, in FIG. 1D the first OFDM-enabled endpoint 151A includes the parameter data 133 and a communication unit 145B and the Nth OFDM-enabled endpoint 151N includes the parameter data 133 and a communication unit 145C. The parameter data 133 is described above and similar description is not repeated here. The communication units 145B and 145C may have a structure similar to that of the communication unit 145A and provide functionality similar to that of the communication unit 145A. Similar description is not repeated here. The communication units 145A, 145B and 145C may be referred to as "communication unit 145" individually or collectively.

An example process executed by the OFDM signal module 199 is described here. In some embodiments, the OFDM signal module 199 includes code and routines that are operable, when executed by a processor of the vehicle 123, to cause the processor to execute operations such as one or more of the following: (1) retrieving history data; (2) determining a number of pilot subcarriers based on the history data; (3) determining a location of each pilot subcarrier based on the history data; (4) configuring one or more parameters based on operations (2) and (3); (5) informing a receiver about the location of each pilot subcarrier through a control channel shared between a transmitter and the receiver (e.g., the vehicle 123 is the transmitter and the OFDM-enabled endpoint 151 is the receiver); (6) configuring subcarriers of an OFDM waveform based on the one or more parameters (the subcarriers here includes the pilot subcarriers, a set of data subcarriers and a set of guard subcarriers); (7) transmitting the OFDM waveform; (8) instructing the OFDM radar 195 to listen for radar feedback associated with the transmitted OFDM waveform; (9) receiving the radar feedback via the OFDM radar 195; (10) storing the radar feedback as radar data; (11) performing radar processing based on the radar data; and (12) updating the history data based on the radar data.

As described herein, some embodiments in the disclosure are illustrated with reference to an OFDM signal (or correspondingly an OFDM waveform) while some embodiments in the disclosure are illustrated with reference to a wireless signal. Here, the OFDM signal is used as an example of the wireless signal. It should be noted that embodiments described herein can be implemented using any suitable type of wireless signals such as the OFDM signal.

Example Computer System

Figure 2:
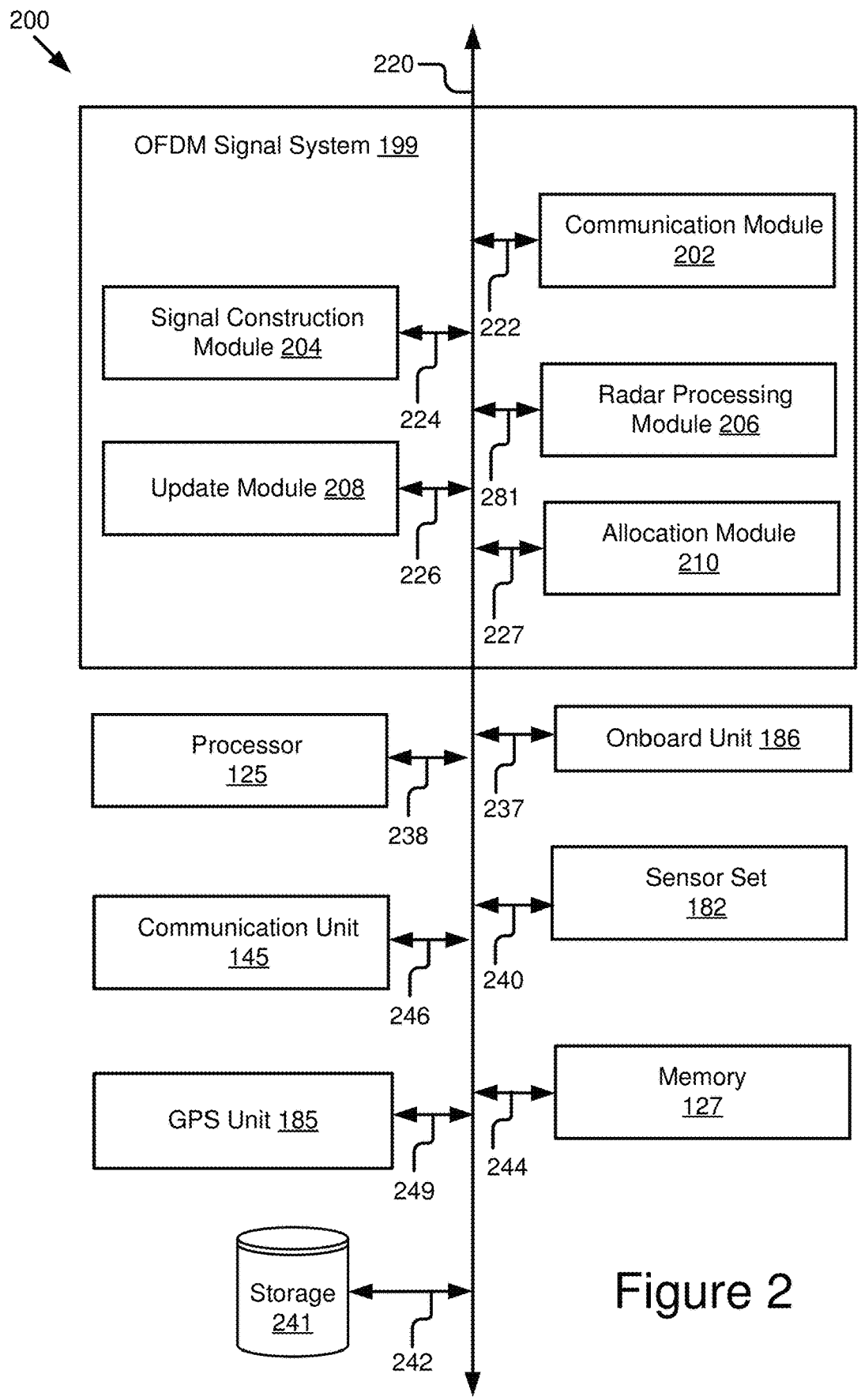
FIG. 2 is a block diagram illustrating an example computer system including an OFDM signal module according to some embodiments.

Referring now to FIG. 2, depicted is a block diagram illustrating an example computer system 200 including the OFDM signal module 199 according to some embodiments. In some embodiments, the computer system 200 may include a special-purpose computer system that is programmed to perform one or more steps of methods 300-600 described below with reference to FIGS. 3-6B.

In some embodiments, the computer system 200 may be an element of a connected device (e.g., the vehicle 123). The computer system 200 may include one or more of the following elements according to some examples: the OFDM signal module 199; the processor 125; the communication unit 145; the GPS unit 185; the onboard unit 186; the sensor set 182; the memory 127; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The GPS unit 185 is communicatively coupled to the bus 220 via a signal line 249. The onboard unit 186 is communicatively coupled to the bus 220 via a signal line 237. The sensor set 182 is communicatively coupled to the bus 220 via a signal line 240. The storage 241 is communicatively coupled to the bus 220 via a signal line 242. The memory 127 is communicatively coupled to the bus 220 via a signal line 244.

The following elements of the computer system 200 are described above with reference to FIG. 1, and so, those descriptions will not be repeated here: the processor 125; the communication unit 145; the GPS unit 185; the onboard unit 186; the sensor set 182; and the memory 127.

The memory 127 may store any of the data described above with reference to FIG. 1D. The memory 127 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the OFDM signal module 199 includes: a communication module 202; a signal construction module 204; a radar processing module 206; an update module 208; and an allocation module 210. These components of the OFDM signal module 199 are communicatively coupled to each other via the bus 220. In some embodiments, components of the OFDM signal module 199 can be stored in a single server or device. In some other embodiments, components of the OFDM signal module 199 can be distributed and stored across multiple servers or devices. For example, some of the components of the OFDM signal module 199 may be distributed across the vehicle 123 and the OFDM-enabled endpoint 151.

The communication module 202 can be software including routines for handling communications between the OFDM signal module 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, one or more wireless signals such as OFDM signals. The communication module 202 may send or receive any of the data or messages described above with reference to FIG. 1D via the communication unit 145.

In some embodiments, the communication module 202 receives data from components of the OFDM signal module 199 and stores the data in one or more of the storage 241 and the memory 127. For example, the communication module 202 receives any of the data described above with reference to the memory 127 from the communication unit 145 (via the network 105, an OFDM signal, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the OFDM signal module 199. For example, the communication module 202 may handle communications among the signal construction module 204, the radar processing module 206, the update module 208 and the allocation module 210. Any of these modules may cause the communication module 202 to communicate with the other elements of the computer system 200 or the operating environment 100 (via the communication unit 145).

The signal construction module 204 can be software including routines for constructing a wireless signal such as an OFDM signal. In some embodiments, the signal construction module 204 can be stored in the memory 127 of the computer system 200 and can be accessible and executable by the processor 125. The signal construction module 204 may be adapted for cooperation and communication with the processor 125 and other components of the computer system 200 via a signal line 224.

In some embodiments, the signal construction module 204 is operable to construct a wireless signal using one or more of: (1) a set of pilot subcarriers; (2) a set of data subcarriers; and (3) a set of guard subcarriers. For example, the set of pilot subcarriers is encoded with a set of pilot symbols respectively (e.g., each pilot subcarrier is encoded with a pilot symbol) and the set of data subcarriers is encoded with a set of data symbols respectively (e.g., each data subcarrier is encoded with a data symbol). Then, the wireless signal includes a combination of: (1) the set of guard subcarriers (e.g., the guard subcarriers can be encoded with guard symbols or transmitted without encoding); (2) the set of pilot subcarriers, with each pilot subcarrier being encoded with a corresponding pilot symbol; and (3) the set of data subcarrier, with each data subcarrier being encoded with a corresponding data symbol.

In some embodiments, the set of pilot subcarriers is used for radar processing and channel estimation while the set of data subcarriers is used for transmitting data. For example, when an intended receiver acquires (or receives) a received version of the wireless signal from the transmitter (e.g., the vehicle 123), the intended receiver can use the pilot symbols (which are known by the receiver in advance) encoded in the pilot subcarriers to estimate a time-varying vehicular channel between the transmitter and the intended receiver from the received version of the wireless signal. Then, the intended receiver can decode the data symbols which are encoded in the data subcarriers from the received version of the wireless signal with the aid of the estimated vehicular channel. Meanwhile, reflections of the transmitted wireless signal can be received by the transmitter (which may be referred to as radar feedback of the wireless signal), and the radar processing module 206 of the transmitter may process the radar feedback as described below. In some embodiments, the intended receiver acquires the received version of the wireless signal from the transmitter by receiving the wireless signal via the communication unit 145.

In some embodiments, the signal construction module 204 retrieves history data describing one or more historical radar processing results from the memory 127 or the storage 241. The signal construction module 204 determines, based on the history data, one or more parameters for configuring one or more of (1) the set of pilot subcarriers, (2) the set of data subcarriers and (3) the set of guard subcarriers in the wireless signal. In this way, in accordance with some embodiments, the radar performance can be improved by analyzing the history data that describes historical radar performance. The history data therefore provides a feedback look that enables the operation of the signal construction module 204 to be continuously improved over time so that the radar performance continuously improves over time. In some embodiments, the signal construction module 204 includes a learning algorithm that analyzes the history data and determines parameters/configurations that improve the radar performance based on historical patterns that are discernable by the signal construction module 204 by analyzing the history data using the learning algorithm. An example configuration for the set of guard subcarriers, the set of pilot subcarriers and the set of data subcarriers is illustrated with reference to FIG. 7.

For example, the one or more parameters includes a pilot-subcarrier parameter that describes a placement of the set of pilot subcarriers in the wireless signal. The signal construction module 204 determines the pilot-subcarrier parameter at least by: determining a number of pilot subcarriers to be included in the set of pilot subcarriers based on the history data; determining a frequency location for each pilot subcarrier in the set of pilot subcarriers based on the history data; and determining the pilot-subcarrier parameter based on the number of pilot subcarriers and the frequency location for each pilot subcarrier.

For example, the one or more parameters further includes a data-subcarrier parameter that describes a placement of the set of data subcarriers in the wireless signal. The signal construction module 204 determines the data-subcarrier parameter at least by: determining a number of data subcarriers to be included in the set of data subcarriers based on the history data; determining a frequency location for each data subcarrier in the set of data subcarriers based on the history data; and determining the data-subcarrier parameter based on the number of data subcarriers and the frequency location for each data subcarrier.

For example, the one or more parameters further includes a guard-subcarrier parameter that describes a placement of the set of guard subcarriers in the wireless signal. The signal construction module 204 determines the guard-subcarrier parameter at least by: determining a number of guard subcarriers to be included in the set of guard subcarriers based on the history data; determining a frequency location for each guard subcarrier in the set of guard subcarriers based on the history data; and determining the guard-subcarrier parameter based on the number of guard subcarriers and the frequency location for each guard subcarrier.

In some embodiments, the placement of the set of pilot subcarriers in the wireless signal is fixed. For example, each of the pilot subcarriers is placed at the same location and a total number of the pilot subcarriers is unchanged over time.

In some other embodiments, the placement of the set of pilot subcarriers in the wireless signal is adaptive. For example, the pilot subcarriers change their locations over time to cover an entire frequency band of the wireless signal (e.g., the locations of the pilot subcarriers change every M symbols, where M is a positive integer). In another example, the total number of the pilot subcarriers changes over time (e.g., the total number of the pilot subcarriers changes every M symbols). An example benefit of changing the locations of the pilot subcarriers includes increasing the unambiguous range of radar processing (e.g., a maximum range from which a transmitted radar pulse can be transmitted and received before a next pulse is transmitted).

In some embodiments, whether an adaptive placement or a fixed placement for the set of pilot subcarriers is used is a function of the one or more parameters (e.g., the pilot-subcarrier parameter). The adaptive placement of the pilot subcarriers is described below in more detail with reference to the update module 208.

In some embodiments, the placement of the set of data subcarriers in the wireless signal is fixed. For example, each of the data subcarriers is placed at the same location and a total number of the data subcarriers is unchanged over time.

In some other embodiments, the placement of the set of data subcarriers in the wireless signal is adaptive. For example, the data subcarriers change their locations over time. In a further example, the data subcarriers change their locations over time to accommodate the location changes of the pilot subcarriers in the wireless signal (e.g., the locations of the data subcarriers change every M symbols since the locations of the pilot subcarriers change every M symbols). For example, the total number of the pilot subcarriers changes over time. In a further example, the total number of the pilot subcarriers changes over time to accommodate the change of the total number of the pilot subcarriers in the wireless signal (e.g., the total number of the data subcarriers changes every M symbols since the total number of the pilot subcarriers changes every M symbols).

In some embodiments, whether an adaptive placement or a fixed placement for the set of data subcarriers is used is a function of the one or more parameters (e.g., the data-subcarrier parameter). Alternatively or additionally, whether an adaptive placement or a fixed placement for the set of data subcarriers is used depends on a placement mode of the pilot subcarriers (e.g., depending on whether a placement of the pilot subcarriers is fixed or adaptive), and vice versa. For example, if the placement of the pilot subcarriers in the wireless signal changes over time, then the placement of the data subcarriers in the wireless signals may also change over time. In another example, if the placement of the pilot subcarriers in the wireless signal is fixed, then the placement of the data subcarriers in the wireless signal is also fixed.

The adaptive placement of the data subcarriers is described below in more detail with reference to the update module 208.

An example fixed placement of the pilot subcarriers and the data subcarriers is illustrated with reference to FIG. 8. Examples adaptive placements of the pilot subcarriers and the data subcarriers are illustrated with reference to FIGS. 9A-9B, respectively.

Generally, a utilization of more pilot subcarriers in the wireless signal improves the radar performance, while a utilization of more data subcarriers in the wireless signal increases the achievable data rate. Thus, by varying the number of the pilot subcarriers and the number of the data subcarriers in the wireless signal, a balance on a tradeoff between the radar performance and the data communication performance can be achieved. The modification of the number of the pilot subcarriers and the number of the data subcarriers in the wireless signal is described below with reference to the update module 208.

Next, the signal construction module 204 informs the intended receiver of the one or more parameters through a control channel shared between the transmitter and the intended receiver, so that the intended receiver can use the one or more parameters to decode the received version of the wireless signal.

The signal construction module 204 configures the set of pilot subcarriers, the set of data subcarriers and the set of guard subcarriers in the wireless signal based on the one or more parameters so that the wireless signal is constructed according to the one or more parameters. For example, the signal construction module 204 configures the set of pilot subcarriers in the wireless signal based on the pilot-subcarrier parameter, configures the set of data subcarriers in the wireless signal based on the data-subcarrier parameter and configures the set of guard subcarriers in the wireless signal based on the guard-subcarrier parameter.

The signal construction module 204 may transmit the wireless signal to the intended receiver via the communication unit 145. For example, the signal construction module 204 may instruct the OFDM transmitter 193 included in the communication unit 145 to transmit the wireless signal.

The radar processing module 206 can be software including routines for processing radar data. In some embodiments, the radar processing module 206 can be stored in the memory 127 of the computer system 200 and can be accessible and executable by the processor 125. The radar processing module 206 may be adapted for cooperation and communication with the processor 125 and other components of the computer system 200 via a signal line 281.

In some embodiments, the radar processing module 206 listens for radar feedback associated with the wireless signal with the aid of the OFDM radar 195. For example, the radar processing module 206 instructs the OFDM radar 195 to listen for radar feedback associated with the transmitted wireless signal and receives the radar feedback from the OFDM radar 195. The radar processing module 206 determines pilot-subcarrier radar data from the radar feedback, where the pilot-subcarrier radar data describes a part of the radar feedback that is associated with the set of pilot subcarriers. For example, the radar feedback describes reflections of the transmitted wireless signal and includes the pilot-subcarrier radar data and data-subcarrier radar data. The pilot-subcarrier radar data describes a first portion of the reflections that is associated with the set of pilot subcarriers encoded with pilot symbols, while the data-subcarrier radar data describes a second portion of the reflections that is associated with the set of data subcarriers encoded with data symbols.

The radar processing module 206 generates a radar processing result based on the pilot-subcarrier radar data to reduce a peak to side-lobe ratio of a radar processing result. For example, compared with using the data-subcarrier radar data to perform radar processing, the application of the pilot-subcarrier radar data can reduce the peak to side-lobe ratio of the radar processing result because the pilot symbols encoded in the pilot subcarriers are known in advance and can be specially defined while the data symbols encoded in the data subcarriers are unknown.

For example, the radar processing module 206 may determine the range and the velocity of the intended receiver (as well as a range and a velocity of any other object that reflects the wireless signal) based on the pilot-subcarrier radar data. The radar processing result includes, for example, the range and the velocity of the intended receiver (as well as the range and the velocity of any other object that reflects the wireless signal). The radar processing result may also include other results from the radar processing.

The update module 208 can be software including routines for performing update operations (e.g., updating one or more of: history data; and one or more parameters). In some embodiments, the update module 208 can be stored in the memory 127 of the computer system 200 and can be accessible and executable by the processor 125. The update module 208 may be adapted for cooperation and communication with the processor 125 and other components of the computer system 200 via a signal line 226.

In some embodiments, the update module 208 is operable to update the history data stored in the memory 127 or the storage 241 based on the radar processing result.

In some embodiments, the update module 208 assesses radar performance based on the radar processing result. For example, the update module 208 evaluates whether the range and the velocity of the intended receiver (or any other detected object) obtained from the radar processing result is accurate.

In some embodiments, the update module 208 modifies, based on the radar performance, one or more of: (1) the placement of the set of pilot subcarriers in the wireless signal; and (2) the placement of the set of data subcarriers in the wireless signal. For example, based on the radar performance, the update module 208 determines one or more of: an adaptive placement for the set of pilot subcarriers; and an adaptive placement for the set of data subcarriers.

In some embodiments, the update module 208 modifies the placement of the set of pilot subcarriers in the wireless signal at least by performing one or more of: (1) changing one or more locations of one or more pilot subcarriers in the set of pilot subcarriers; and (2) changing a number of pilot subcarriers included in the set of pilot subcarriers (e.g., increasing or decreasing the number of pilot subcarriers in the wireless signal).

In some embodiments, the update module 208 modifies the placement of the set of data subcarriers in the wireless signal at least by performing one or more of: (1) changing one or more locations of one or more data subcarriers in the set of data subcarriers; and (2) changing a number of data subcarriers included in the set of data subcarriers (e.g., increasing or decreasing the number of data subcarriers in the wireless signal).

In some scenarios, the update module 208 can adopt an adaptive pilot-subcarrier placement, an adaptive data-subcarrier placement, or a combination thereof to enhance the radar performance or the data communication performance of the OFDM system 197. Specifically, the update module 208 can dynamically vary the number of pilot subcarriers and the number of data subcarriers in the wireless signal. For example, the update module 208 can increase the number of pilot subcarriers and reduce the number of data subcarriers in the wireless signal to improve the radar performance. In another example, the update module 208 can decrease the number of pilot subcarriers and increase the number of data subcarriers in the wireless signal to improve the data communication performance (e.g., in this case, an achievable data rate is increased). By varying the number of the pilot subcarriers and the number of the data subcarriers in the wireless signal, the OFDM system 197 described herein can achieve a balance on a tradeoff between the radar performance and the data communication performance.

The allocation module 210 can be software including routines for allocating subcarriers to members of a vehicular micro cloud. In some embodiments, the allocation module 210 can be stored in the memory 127 of the computer system 200 and can be accessible and executable by the processor 125. The allocation module 210 may be adapted for cooperation and communication with the processor 125 and other components of the computer system 200 via a signal line 227.

In some embodiments, the allocation module 210 is operable to allocate the set of pilot subcarriers and the set of data subcarriers to different members (e.g., different vehicles, roadside units, or other types of endpoints) of a vehicular micro cloud. For example, the allocation module 210 assigns the set of pilot subcarriers and the set of data subcarriers to different members in a vehicular micro cloud, so that each member is assigned with at least a pilot subcarrier and one or more data subcarriers next to the pilot subcarrier for a certain period of time. In this way, multiple access of a pilot-subcarrier-based OFDM radar is implemented. Radar interference can be avoided among the members in the vehicular micro cloud.

Specifically, the allocation module 210 allocates available subcarriers among different members of the vehicular micro cloud, with each member being assigned with one or more pilot subcarrier locations, one or more data subcarrier locations, a duration for each assigned pilot subcarrier and a duration for each assigned data subcarrier. This allocation can be implemented locally rather than by a cloud server. Of course, in some embodiments, this allocation can also be implemented by a cloud server.

An example allocation scheme is illustrated with reference to FIGS. 10A-10B.

Example Processes

Figure 3:
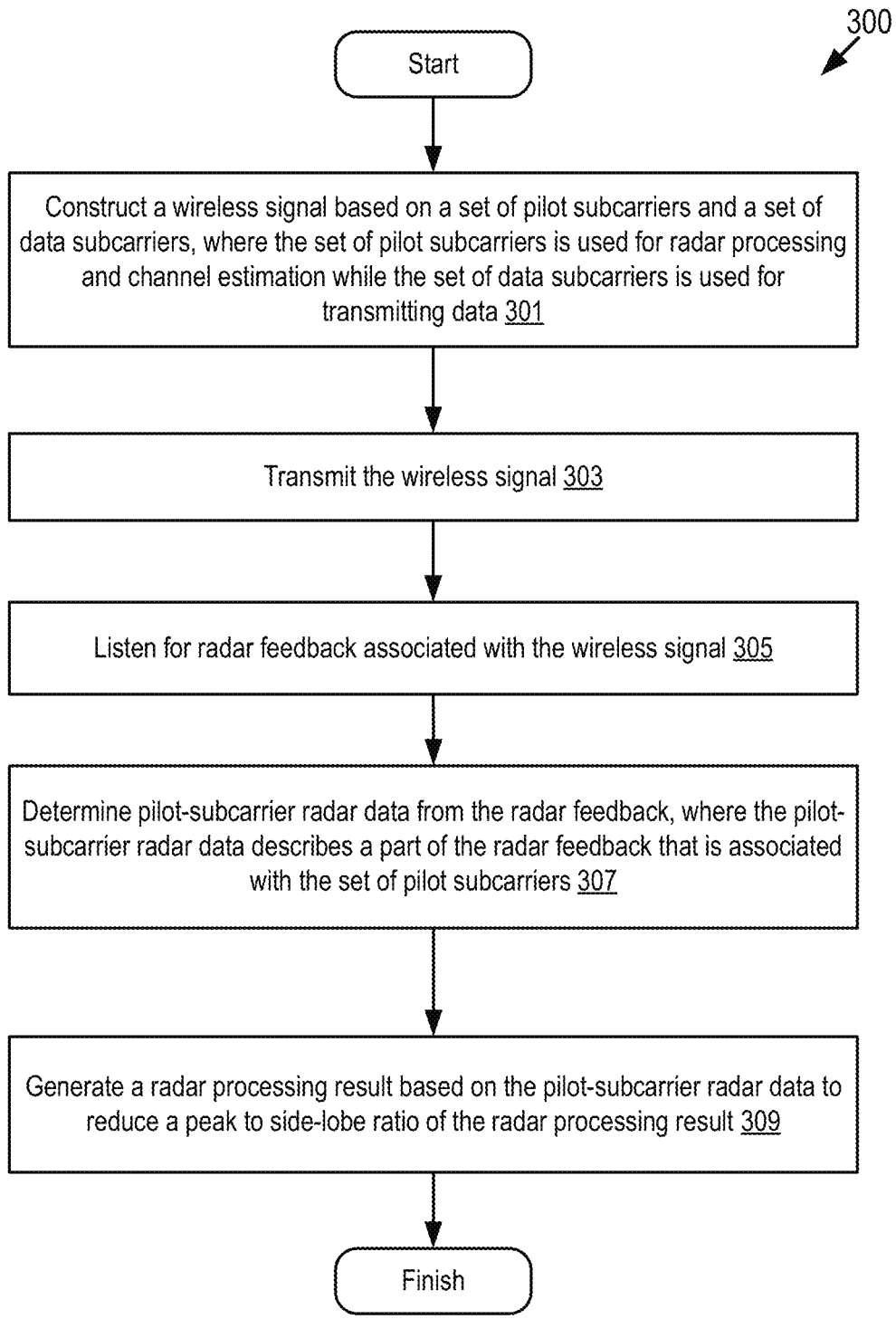
FIG. 3 depicts a method for performing integrated vehicular radar processing and data communications according to some embodiments.

Referring now to FIG. 3, depicted is a flowchart of an example method 300 for performing integrated vehicular radar processing and data communications according to some embodiments. The steps of the method 300 are executable in any order, and not necessarily the order depicted in FIG. 3.

At step 301, the signal construction module 204 constructs a wireless signal based on a set of pilot subcarriers and a set of data subcarriers, where the set of pilot subcarriers is used for radar processing and channel estimation while the set of data subcarriers is used for transmitting data.

At step 303, the signal construction module 204 transmits the wireless signal via the communication unit 145.

At step 305, the radar processing module 206 listens for radar feedback associated with the wireless signal with the aid of the OFDM radar 195. For example, the radar processing module 206 instructs the OFDM radar 195 to detect radar feedback associated with the wireless signal and receives the radar feedback from the OFDM radar 195.

At step 307, the radar processing module 206 determines pilot-subcarrier radar data from the radar feedback, where the pilot-subcarrier radar data describes a part of the radar feedback that is associated with the set of pilot subcarriers.

At step 309, the radar processing module 206 generates a radar processing result based on the pilot-subcarrier radar data to reduce a peak to side-lobe ratio of the radar processing result.

Figure 4:
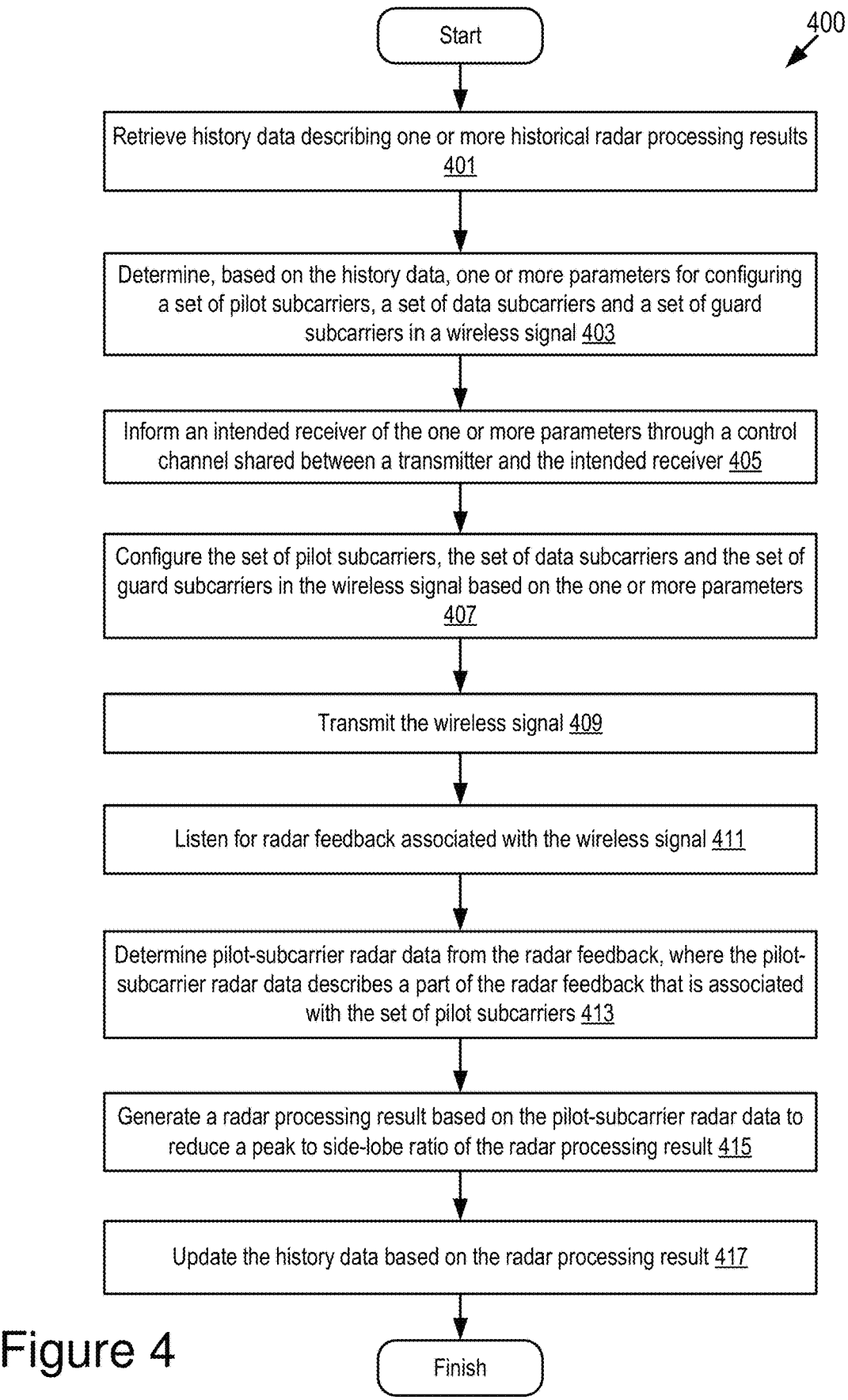
FIG. 4 depicts another method for performing integrated vehicular radar processing and data communications according to some embodiments.

FIG. 4 depicts another method 400 for performing integrated vehicular radar processing and data communications according to some embodiments. The steps of the method 400 are executable in any order, and not necessarily the order depicted in FIG. 4.

At step 401, the signal construction module 204 retrieves history data describing one or more historical radar processing results.

At step 403, the signal construction module 204 determines, based on the history data, one or more parameters for configuring a set of pilot subcarriers, a set of data subcarriers and a set of guard subcarriers in a wireless signal. An example method for determining the one or more parameters is described below with reference to FIG. 5.

At step 405, the signal construction module 204 informs an intended receiver of the one or more parameters through a control channel shared between a transmitter and the intended receiver.

At step 407, the signal construction module 204 configures the set of pilot subcarriers, the set of data subcarriers and the set of guard subcarriers in the wireless signal based on the one or more parameters.

At step 409, the signal construction module 204 transmits the wireless signal via the communication unit 145.

At step 411, the radar processing module 206 listens for radar feedback associated with the wireless signal with the aid of the OFDM radar 195.

At step 413, the radar processing module 206 determines pilot-subcarrier radar data from the radar feedback, where the pilot-subcarrier radar data describes a part of the radar feedback that is associated with the set of pilot subcarriers.

At step 415, the radar processing module 206 generates a radar processing result based on the pilot-subcarrier radar data to reduce a peak to side-lobe ratio of a radar processing result.

Figure 5:
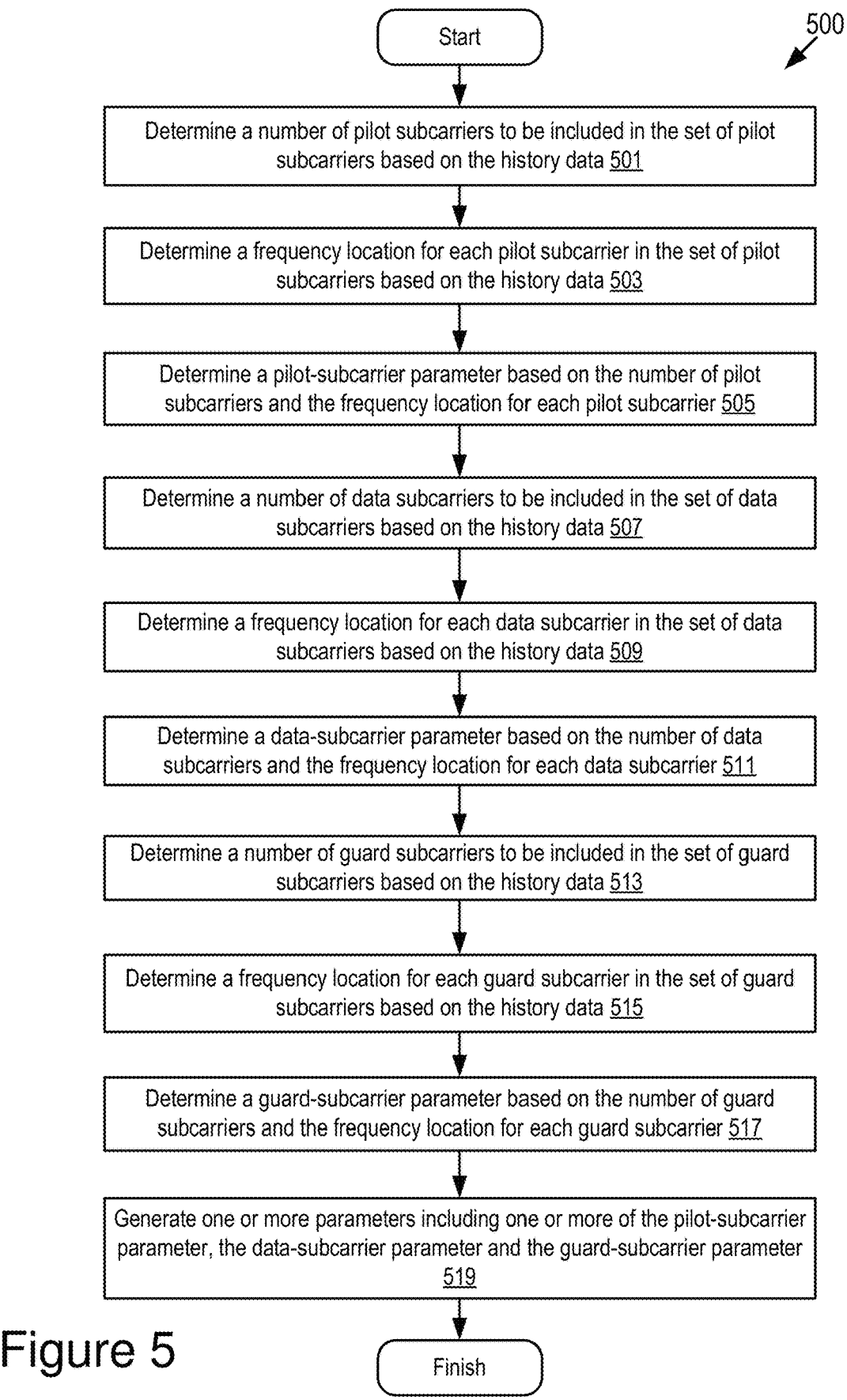
FIG. 5 depicts a method for determining one or more parameters for constructing a wireless signal according to some embodiments.

At step 417, the update module 208 updates the history data based on the radar processing result FIG. 5 depicts a method 500 for determining one or more parameters that is used for constructing a wireless signal according to some embodiments. The steps of the method 500 are executable in any order, and not necessarily the order depicted in FIG. 5.

At step 501, the signal construction module 204 determines a number of pilot subcarriers to be included in the set of pilot subcarriers based on the history data.

At step 503, the signal construction module 204 determines a frequency location for each pilot subcarrier in the set of pilot subcarriers based on the history data.

At step 505, the signal construction module 204 determines a pilot-subcarrier parameter based on the number of pilot subcarriers and the frequency location for each pilot subcarrier.

At step 507, the signal construction module 204 determines a number of data subcarriers to be included in the set of data subcarriers based on the history data.

At step 509, the signal construction module 204 determines a frequency location for each data subcarrier in the set of data subcarriers based on the history data.

At step 511, the signal construction module 204 determines a data-subcarrier parameter based on the number of data subcarriers and the frequency location for each data subcarrier.

At step 513, the signal construction module 204 determines a number of guard subcarriers to be included in the set of guard subcarriers based on the history data.

At step 515, the signal construction module 204 determines a frequency location for each guard subcarrier in the set of guard subcarriers based on the history data.

At step 517, the signal construction module 204 determines a guard-subcarrier parameter based on the number of guard subcarriers and the frequency location for each guard subcarrier.

At step 519, the signal construction module 204 generates the one or more parameters including one or more of the pilot-subcarrier parameter, the data-subcarrier parameter, and the guard-subcarrier parameter.

Figure 6A:
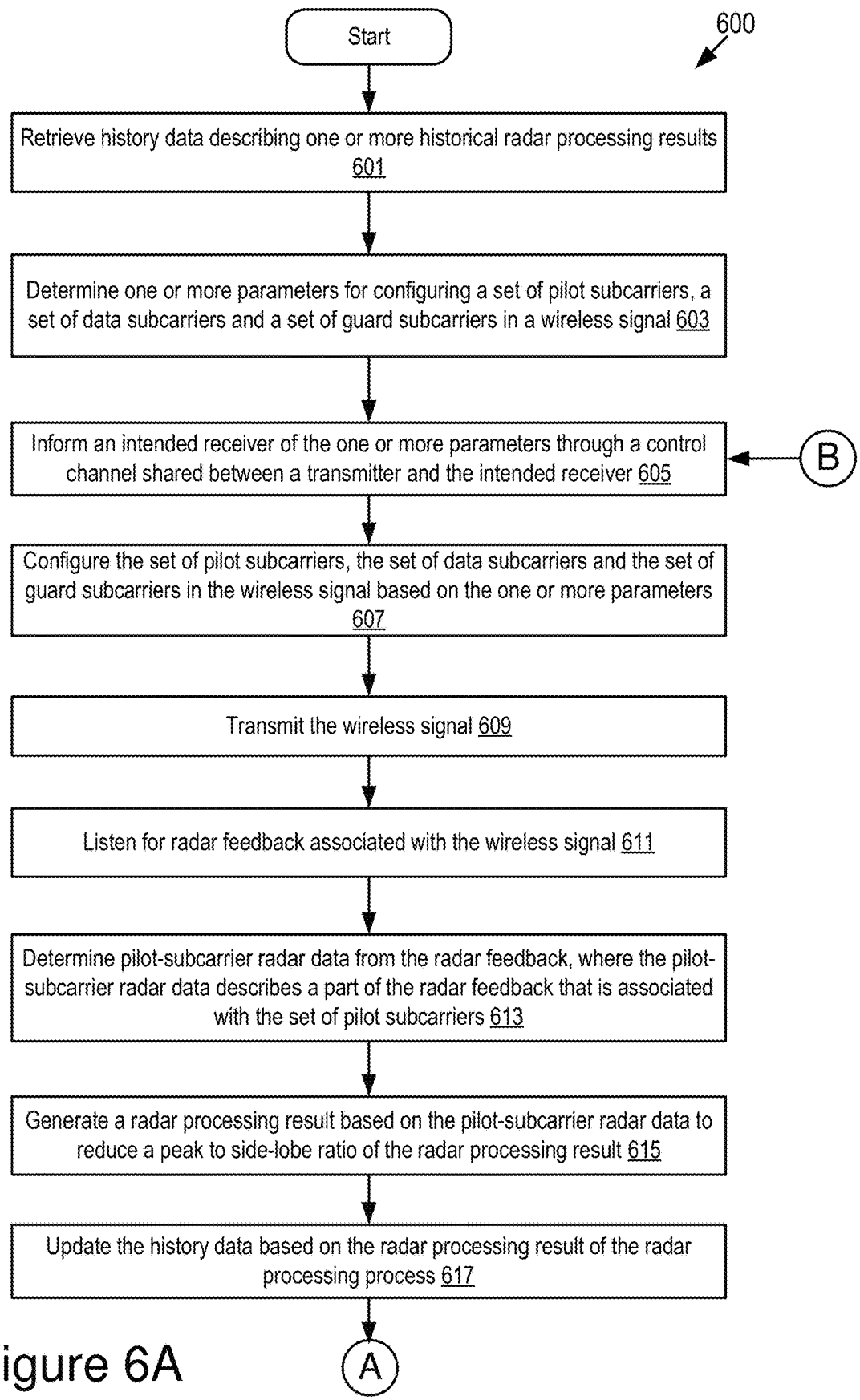
FIGS. 6A-6B depict yet another method for performing integrated vehicular radar processing and data communications according to some embodiments.
Figure 6B:
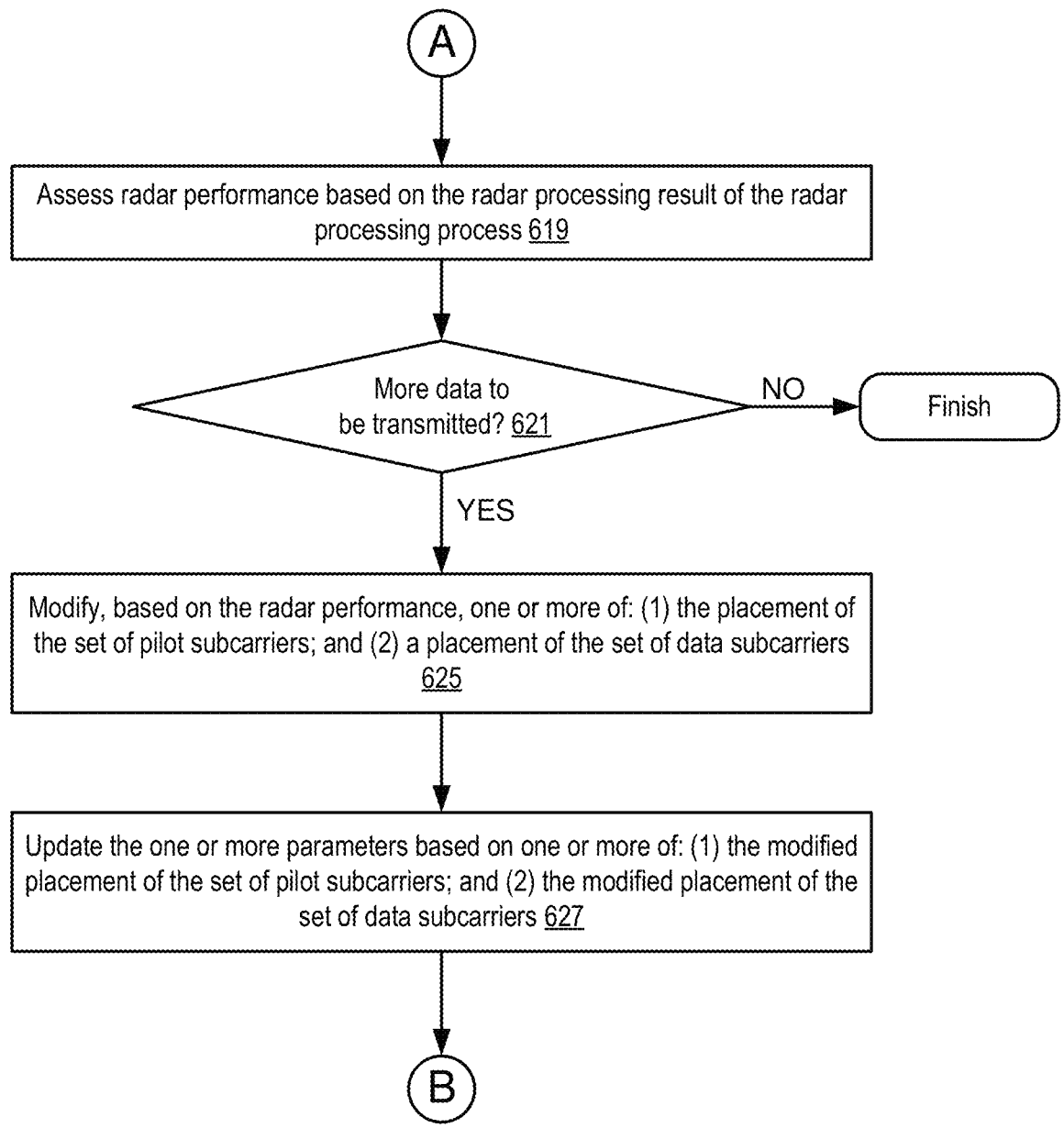

FIGS. 6A-6B depict yet another method 600 for performing integrated vehicular radar processing and data communications according to some embodiments. The steps of the method 600 are executable in any order, and not necessarily the order depicted in FIGS. 6A-6B.

Referring to FIG. 6A, at step 601, the signal construction module 204 retrieves history data describing one or more historical radar processing results.

At step 603, the signal construction module 204 determines, based on the history data, one or more parameters for configuring a set of pilot subcarriers, a set of data subcarriers and a set of guard subcarriers in a wireless signal.

At step 605, the signal construction module 204 informs an intended receiver of the one or more parameters through a control channel shared between a transmitter and the intended receiver.

At step 607, the signal construction module 204 configures the set of pilot subcarriers, the set of data subcarriers and the set of guard subcarriers in the wireless signal based on the one or more parameters.

At step 609, the signal construction module 204 transmits the wireless signal via the communication unit 145.

At step 611, the radar processing module 206 listens for radar feedback associated with the wireless signal with the aid of the OFDM radar 195.

At step 613, the radar processing module 206 determines pilot-subcarrier radar data from the radar feedback, where the pilot-subcarrier radar data describes a part of the radar feedback that is associated with the set of pilot subcarriers.

At step 615, the radar processing module 206 generates a radar processing result based on the pilot-subcarrier radar data to reduce a peak to side-lobe ratio of the radar processing result.

At step 617, the update module 208 updates the history data based on the radar processing result.

Referring to FIG. 6B, at step 619, the update module 208 assesses radar performance based on the radar processing result.

At step 621, the update module 208 determines whether there is more data to be transmitted. If there is more data to be transmitted, the method 600 moves to step 625. Otherwise, the method 600 ends.

At step 625, the update module 208 modifies, based on the radar performance, one or more of: (1) a placement of the set of pilot subcarriers; and (2) a placement of the set of data subcarriers.

At step 627, the update module 208 updates the one or more parameters based on one or more of: (1) the modified placement of the set of pilot subcarriers; and (2) the modified placement of the set of data subcarriers.

Following step 627, the method 600 moves back to step 605 to inform the intended receiver of the one or more updated parameters. The method 600 continues to perform operations similar to those described above, including constructing the wireless signal based on the one or more updated parameters and transmitting the wireless signal, etc. Similar description is not repeated here.

FIG. 7 is a graphical representation 700 illustrating subcarriers of an example wireless signal according to some embodiments. In FIG. 7, the example wireless signal is constructed using six guard subcarriers 705 (e.g., three guard subcarriers at the beginning and another three guard subcarriers at the end), four pilot subcarriers 701 and twenty-four data subcarriers 703 (with eight data subcarriers 703 between each two adjacent pilot subcarriers 701). The pilot subcarriers 701, the data subcarriers 703 and the guard subcarriers 705 are orthogonal signals in the frequency domain such that each subcarrier has nulls at locations of other subcarriers (e.g., similar to that illustrated in FIG. 1B).

Figure 8:
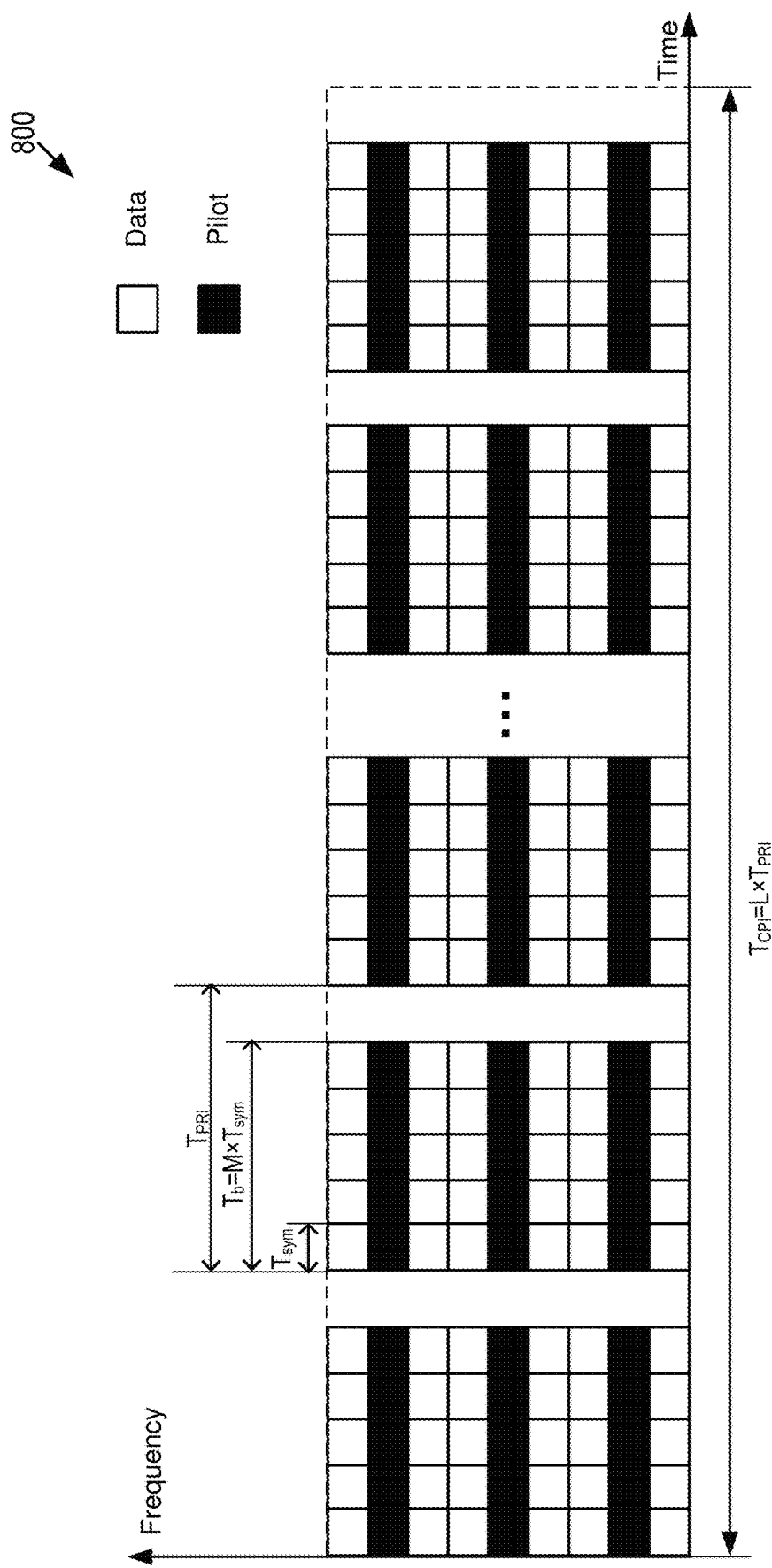
FIG. 8 is a graphical representation illustrating a fixed placement of pilot subcarriers in an example wireless signal according to some embodiments.

FIG. 8 is a graphical representation 800 illustrating a fixed placement of pilot subcarriers in an example wireless signal according to some embodiments. By way of examples, three pilot subcarriers and six data subcarriers are illustrated in each symbol period $T_{sym}$ (e.g., $T_{sym}$ representing a duration of a symbol). Thus, in each symbol period $T_{sym}$, three pilot symbols and six data symbols can be transmitted via the three pilot subcarriers and the six data subcarriers respectively.

In each symbol block period ($T_b = M \times T_{sym}$), M symbols are transmitted in each subcarrier. M is a positive integer. For example, during each symbol block period $T_b$, each pilot subcarrier can be used to transmit M pilot symbols and each data subcarrier can be used to transmit M data symbols. Each two symbol block period $T_b$ is separated by a free interval (e.g., during the free interval, no signal is transmitted). A period for prefix insertion is illustrated as $T_{PRI}$ in FIG. 8 to include the symbol block period $T_b$ and the free interval. The example wireless signal illustrated in FIG. 8 can include L cyclic prefix insertions (CPIs), which lasts for a period of $T_{CPI} = L \times T_{PRI}$. L is a positive integer.

In FIG. 8, a placement of the pilot subcarriers and a placement of the data subcarriers are fixed. For example, a total number of pilot subcarriers, a frequency location of each pilot subcarrier, a total number of data subcarriers and a frequency location of each data subcarrier in each symbol block period $T_b$ are fixed.

Figure 9A:
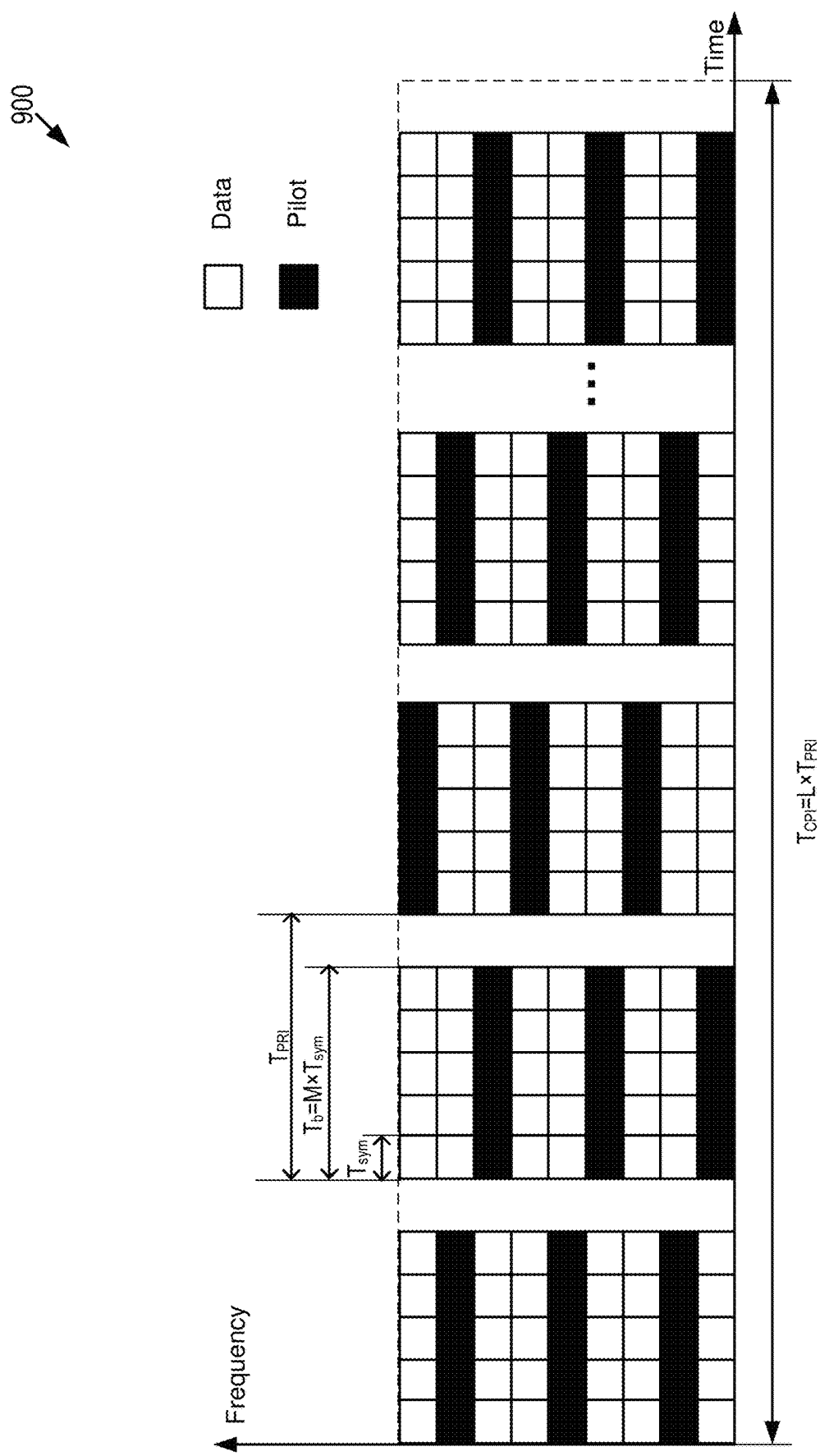
FIG. 9A is a graphical representation illustrating an adaptive placement of pilot subcarriers in an example wireless signal according to some embodiments.

FIG. 9A is a graphical representation 900 illustrating an adaptive placement of pilot subcarriers in an example wireless signal according to some embodiments. Compared with FIG. 8, the placement of the pilot subcarriers and the placement of the data subcarriers in FIG. 9A change over time. For example, within each symbol block period $T_b$, a total number of pilot subcarriers, a frequency location of each pilot subcarrier, a total number of data subcarriers and a frequency location of each data subcarrier are fixed. However, the frequency location of each pilot subcarrier is changed in different symbol block periods $T_b$. For example, in the "Time" axis, the frequency location of each pilot subcarrier changes every M symbols. At least a part of the data subcarriers also change their frequency locations in different symbol block periods $T_b$.

Figure 9B:
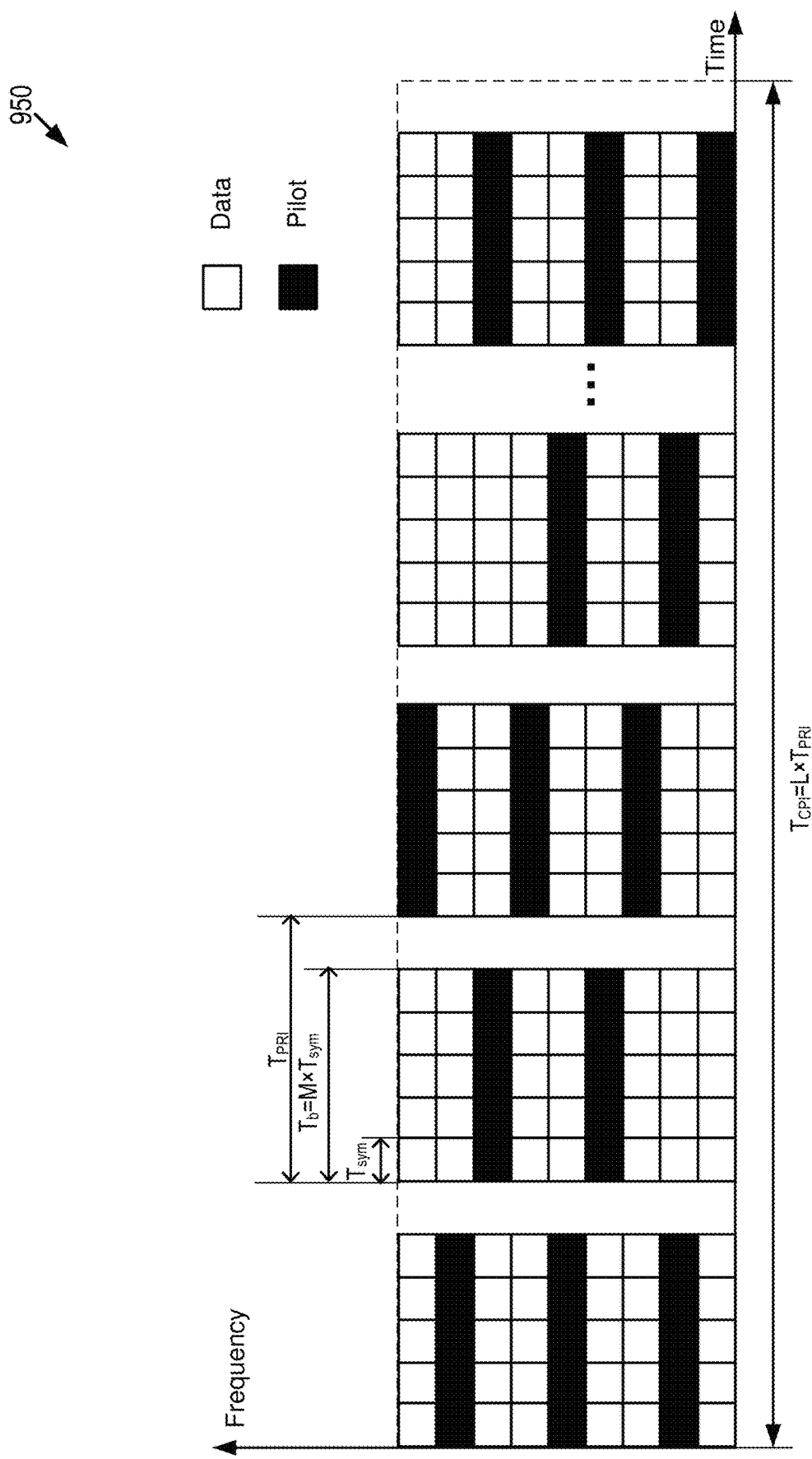
FIG. 9B is a graphical representation illustrating another adaptive placement of pilot subcarriers in an example wireless signal according to some embodiments.

FIG. 9B is a graphical representation 950 illustrating another adaptive placement of pilot subcarriers in an example wireless signal according to some embodiments. Within each symbol block period $T_b$, a total number of pilot subcarriers, a frequency location of each pilot subcarrier, a total number of data subcarriers and a frequency location of each data subcarrier are fixed.

With respect to different symbol block periods $T_b$, when compared with FIG. 9A, not only the frequency location of each pilot subcarrier is changed in different symbol block periods $T_b$, but also the total number of pilot subcarriers is changed in different symbol block periods $T_b$. For example, in the "Time" axis, the frequency location of each pilot subcarrier and the total number of the pilot subcarriers change every M symbols. Correspondingly, a total number of data subcarriers is also changed in different symbol block periods $T_b$, and at least a part of the data subcarriers change their frequency locations in different symbol block periods $T_b$.

Figure 10A:
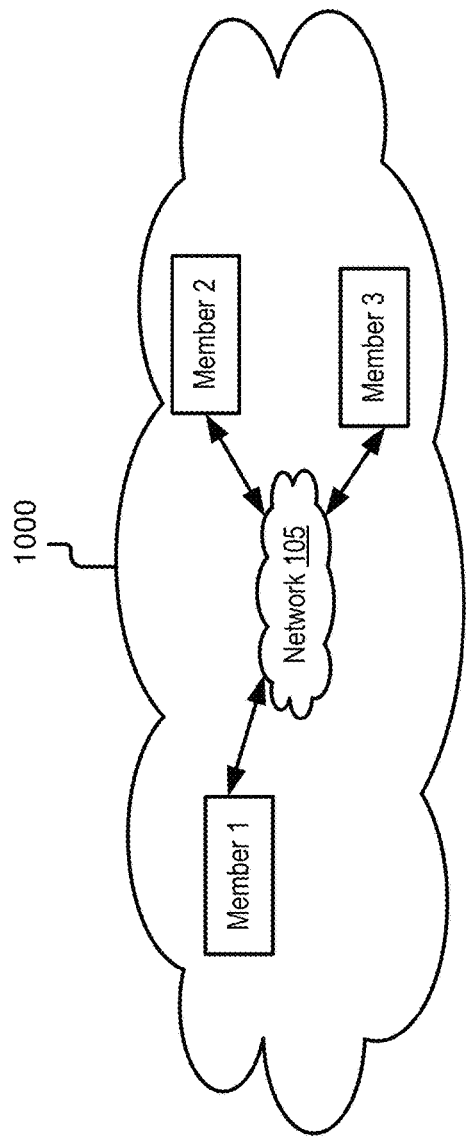
FIGS. 10A-10B are graphical representations illustrating a subcarrier-allocation scheme in a vehicular micro cloud according to some embodiments.
Figure 10B:
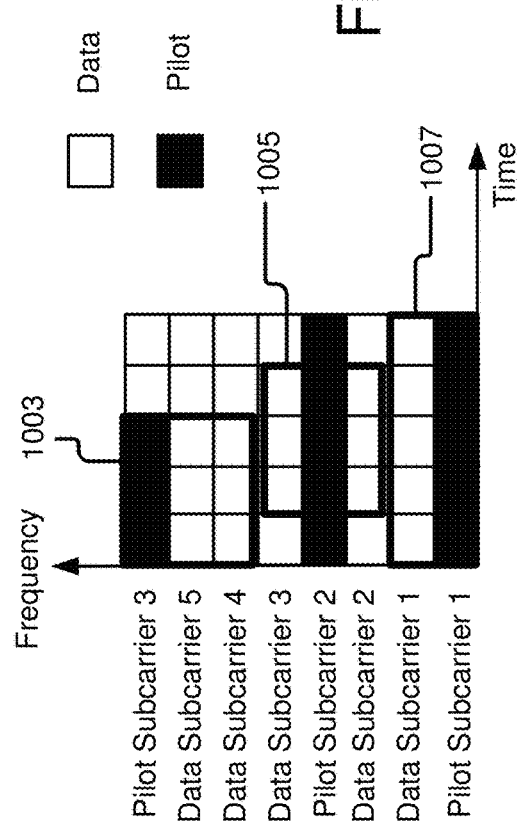

FIGS. 10A-10B are graphical representations illustrating a subcarrier-allocation scheme in a vehicular micro cloud 1000 according to some embodiments. As illustrated in FIG. 10A, the vehicular micro cloud 1000 includes three members (member 1, member 2 and member 3). In FIG. 10B, each member is assigned with a pilot subcarrier and one or more data subcarriers next to or adjacent to the assigned pilot subcarrier. For example, member 1 is assigned with a first pilot subcarrier (Pilot Subcarrier 1) and a first data subcarrier (Data Subcarrier 1) for a first period of time, which is illustrated in a box 1007. Member 2 is assigned with a second pilot subcarrier (Pilot Subcarrier 2) and a second and a third data subcarriers (Data Subcarrier 2 and Data Subcarrier 3) for a second period of time, which is illustrated in a box 1005. Member 3 is assigned with a third pilot subcarrier (Pilot Subcarrier 3) and a fourth and a fifth data subcarriers (Data Subcarrier 4 and Data Subcarrier 5) for a third period of time, which is illustrated in a box 1003.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
constructing a wireless signal based on a set of pilot subcarriers and a set of data subcarriers, wherein the set of pilot subcarriers is used for radar processing and channel estimation while the set of data subcarriers is used for transmitting data;
transmitting the wireless signal;
listening for radar feedback associated with the wireless signal;
determining pilot-subcarrier radar data from the radar feedback, wherein the pilot-subcarrier radar data describes a part of the radar feedback that is associated with the set of pilot subcarriers;
generating a radar processing result based on the pilot-subcarrier radar data to reduce a peak to side-lobe ratio of the radar processing result;
assessing radar performance based on the radar processing result; and modifying one or more locations of the set of pilot subcarriers or one or more locations of the set of data subcarriers in the wireless signal based on the radar performance.

2. The method of claim 1, wherein the set of pilot subcarriers is encoded with a set of pilot symbols respectively and the set of data subcarriers is encoded with a set of data symbols respectively.

3. The method of claim 1, wherein constructing the wireless signal comprises:
retrieving history data describing one or more historical radar processing results;
determining, based on the history data, one or more parameters for configuring one or more of the set of pilot subcarriers, the set of data subcarriers, and a set of guard subcarriers in the wireless signal;
informing an intended receiver of the one or more parameters through a control channel shared between a transmitter and the intended receiver; and
configuring the one or more of the set of pilot subcarriers, the set of data subcarriers, and the set of guard subcarriers in the wireless signal based on the one or more parameters.

4. The method of claim 3, wherein the one or more parameters includes a pilot-subcarrier parameter and determining the one or more parameters comprises:
determining a number of pilot subcarriers to be included in the set of pilot subcarriers based on the history data;
determining a frequency location for each pilot subcarrier in the set of pilot subcarriers based on the history data; and
determining the pilot-subcarrier parameter based on the number of pilot subcarriers and the frequency location for each pilot subcarrier,
wherein the set of pilot subcarriers is configured in the wireless signal based on the pilot-subcarrier parameter.

5. The method of claim 3, wherein the one or more parameters includes a data-subcarrier parameter and determining the one or more parameters comprises:
determining a number of data subcarriers to be included in the set of data subcarriers based on the history data;
determining a frequency location for each data subcarrier in the set of data subcarriers based on the history data; and
determining the data-subcarrier parameter based on the number of data subcarriers and the frequency location for each data subcarrier,
wherein the set of data subcarriers in the wireless signal is configured based on the data-subcarrier parameter.

6. The method of claim 3, wherein the one or more parameters includes a guard-subcarrier parameter and determining the one or more parameters comprises:
determining a number of guard subcarriers to be included in the set of guard subcarriers based on the history data;
determining a frequency location for each guard subcarrier in the set of guard subcarriers based on the history data; and
determining the guard-subcarrier parameter based on the number of guard subcarriers and the frequency location for each guard subcarrier,
wherein the set of guard subcarriers in the wireless signal is configured based on the guard-subcarrier parameter.

7. The method of claim 3, further comprising:
updating the history data based on the radar processing result.

8. The method of claim 1, wherein the one or more locations of the set of data subcarriers change to accommodate a placement of the set of pilot subcarriers.

9. The method of claim 1, wherein the one or more locations of the set of pilot subcarriers in the wireless signal is designed to cover an entire frequency band of the wireless signal.

10. The method of claim 1, wherein the method is performed by an onboard unit of a vehicle that includes a communication subsystem having a communication receiving and a communication transmitter for receiving and transmitting the wireless signal and a radar system for performing radar processing.

11. The method of claim 1, DOB wherein modifying the one or more locations of the set of pilot subcarriers in the wireless signal includes one or more of changing one or more locations of one or more pilot subcarriers in the set of pilot subcarriers and changing a number of pilot subcarriers included in the set of pilot subcarriers.

12. The method of claim 1, wherein modifying the one or more locations of the set of data subcarriers in the wireless signal includes one or more of changing one or more locations of one or more data subcarriers in the set of data subcarriers and changing a number of data subcarriers included in the set of data subcarriers.

13. The method of claim 1, wherein the set of pilot subcarriers and the set of data subcarriers are assigned to members in a vehicular micro cloud so that each member is assigned with at least a pilot subcarrier and one or more data subcarriers next to the pilot subcarrier to avoid radar interference among the members in the vehicular micro cloud.

14. The method of claim 1, wherein the wireless signal includes an Orthogonal Frequency-Division Multiplexing (OFDM) signal.

15. A system for a vehicle, comprising:
a processor; and
a non-transitory memory storing computer code which, when executed by the processor, causes the processor to:
construct a wireless signal based on a set of pilot subcarriers and a set of data subcarriers, wherein the set of pilot subcarriers is used for radar processing and channel estimation while the set of data subcarriers is used for transmitting data;
transmit the wireless signal;
listen for radar feedback associated with the wireless signal;
determine pilot-subcarrier radar data from the radar feedback, wherein the pilot-subcarrier radar data describes a part of the radar feedback that is associated with the set of pilot subcarriers;
generate a radar processing result based on the pilot-subcarrier radar data to reduce a peak to side-lobe ratio of the radar processing result;
assess radar performance based on the radar processing result; and
modify one or more locations of the set of pilot subcarriers or one or more locations of the set of data subcarriers in the wireless signal based on the radar performance.

16. The system of claim 15, wherein the set of pilot subcarriers is encoded with a set of pilot symbols respectively and the set of data subcarriers is encoded with a set of data symbols respectively.

17. The system of claim 15, wherein the computer code, when executed by the processor, causes the processor to construct the wireless signal at least by:

retrieving history data describing one or more historical radar processing results;

determining, based on the history data, one or more parameters for configuring one or more of the set of pilot subcarriers, the set of data subcarriers, and a set of guard subcarriers in the wireless signal;

informing an intended receiver of the one or more parameters through a control channel shared between a transmitter and the intended receiver; and configuring the one or more of the set of pilot subcarriers, the set of data subcarriers, and the set of guard subcarriers in the wireless signal based on the one or more parameters.

18. The system of claim 15, wherein the one or more locations of the set of data subcarriers change to accommodate a placement of the set of pilot subcarriers.

19. A computer program product comprising a non-transitory memory storing computer-executable code that, when executed by a processor, causes the processor to:

construct a wireless signal based on a set of pilot subcarriers and a set of data subcarriers, wherein the set of pilot subcarriers is used for radar processing and channel estimation while the set of data subcarriers is used for transmitting data;

transmit the wireless signal;

listen for radar feedback associated with the wireless signal;

determine pilot-subcarrier radar data from the radar feedback, wherein the pilot-subcarrier radar data describes a part of the radar feedback that is associated with the set of pilot subcarriers;

generate a radar processing result based on the pilot-subcarrier radar data to reduce a peak to side-lobe ratio of the radar processing result;

assess radar performance based on the radar processing result; and modify one or more locations of the set of pilot subcarriers or one or more locations of the set of data subcarriers in the wireless signal based on the radar performance.

20. The computer program product of claim 19, wherein the computer-executable code, when executed by the processor, causes the processor to construct the wireless signal at least by:

retrieving history data describing one or more historical radar processing results;

determining, based on the history data, one or more parameters for configuring one or more of the set of pilot subcarriers, the set of data subcarriers, and a set of guard subcarriers in the wireless signal;

informing an intended receiver of the one or more parameters through a control channel shared between a transmitter and the intended receiver; and configuring the one or more of the set of pilot subcarriers, the set of data subcarriers, and the set of guard subcarriers in the wireless signal based on the one or more parameters.

* * * * *

UNITED STATES PATENT AND TRADEMARK OFFICE
CERTIFICATE OF CORRECTION

Page 1 of 1

PATENT NO. : 10,897,336 B2
APPLICATION NO. : 16/202886
DATED : January 19, 2021
INVENTOR(S) : Altintas et al.

It is certified that error appears in the above-identified patent and that said Letters Patent is hereby corrected as shown below:

In the Claims

Column 28, Line 14, Claim 11 delete "DOB wherein" and insert --wherein-- therefor.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*